US011199907B2

(12) United States Patent
Aggarwal et al.

(10) Patent No.: US 11,199,907 B2
(45) Date of Patent: Dec. 14, 2021

(54) METHOD AND A SYSTEM FOR ASSISTING IN PERFORMING FINANCIAL SERVICES

(71) Applicants:Abhinav Arvindkumar Aggarwal, Mumbai (IN); Raghav Arvindkumar Aggarwal, Mumbai (IN)

(72) Inventors: Abhinav Arvindkumar Aggarwal, Mumbai (IN); Raghav Arvindkumar Aggarwal, Mumbai (IN)

( * ) Notice: Subject to any disclaimer, the term of this patent is extended or adjusted under 35 U.S.C. 154(b) by 42 days.

(21) Appl. No.: 16/610,089

(22) PCT Filed: May 28, 2018

(86) PCT No.: PCT/IB2018/053768
§ 371 (c)(1),
(2) Date: Nov. 1, 2019

(87) PCT Pub. No.: WO2018/220502
PCT Pub. Date: Dec. 6, 2018

(65) Prior Publication Data
US 2020/0081549 A1    Mar. 12, 2020

(30) Foreign Application Priority Data
May 29, 2017 (IN) .............................. 201721018854

(51) Int. Cl.
*G06Q 40/02* (2012.01)
*G06F 3/01* (2006.01)
(Continued)

(52) U.S. Cl.
CPC .............. *G06F 3/017* (2013.01); *G06F 3/011* (2013.01); *G06F 3/0304* (2013.01); *G06F 3/167* (2013.01); *G06Q 40/02* (2013.01)

(58) Field of Classification Search
CPC ........ G06F 3/017; G06F 3/011; G06F 3/0304; G06F 3/167; G06Q 40/02
See application file for complete search history.

(56) References Cited

U.S. PATENT DOCUMENTS 8,228,315 B1     7/2012 Starner et al.
2011/0055049 A1*  3/2011 Harper .................... G06F 3/011
                                                    705/27.1
(Continued)

FOREIGN PATENT DOCUMENTS

KR         101216115 B1    12/2012

OTHER PUBLICATIONS

PCT International Search Report and Written Opinion, Application No. PCT/IB2018/53768, International Filing Date May 28, 2018, dated Sep. 11, 2018, 9 pages.

*Primary Examiner* — Beau D Spratt
(74) *Attorney, Agent, or Firm* — Patent Law Works, LLP

(57) ABSTRACT

A method (150) for assisting in performing financial services, comprises steps of receiving (151) an image of a user from a depth sensing device (102), generating (153) a virtual interface (110) as a response to receiving the image of the user, the virtual interface (110) comprising an intelligent virtual object (1102), wherein the virtual interface (110) is generated as a response to the user entering a first predetermined zone (118), performing (155) one or more of transmitting the virtual interface (110) to a display device (106), and transmitting an audio output to one or more speakers (108), receiving (157) one or more of a gestural input from the depth sensing device (102), and an audio input from a microphone (104) and performing (159) a financial service in response to receiving one or more of the gestural input, and the audio input.

18 Claims, 15 Drawing Sheets

(51) Int. Cl.
*G06F 3/03* (2006.01)
*G06F 3/16* (2006.01)

(56) References Cited

U.S. PATENT DOCUMENTS

| | | | |
|---|---|---|---|
| 2012/0270644 A1 | 10/2012 | Buhr | |
| 2013/0234927 A1* | 9/2013 | Roh | G06F 3/011 345/156 |
| 2014/0140584 A1 | 5/2014 | Lee | |
| 2014/0236740 A1* | 8/2014 | Murray | G06Q 20/10 705/14.73 |
| 2016/0240050 A1* | 8/2016 | Block | G06Q 20/308 |
| 2016/0275760 A1* | 9/2016 | Block | G06Q 20/1085 |
| 2016/0351010 A1 | 12/2016 | Williams et al. | |
| 2016/0366129 A1* | 12/2016 | Chen | G06F 21/32 |
| 2017/0018184 A1* | 1/2017 | Northrup | G07F 17/3237 |
| 2017/0032787 A1 | 2/2017 | Dayal | |
| 2017/0318407 A1* | 11/2017 | Meister | H04S 7/303 |
| 2017/0369278 A1* | 12/2017 | Chapman | B66B 3/006 |

\* cited by examiner

METHOD AND A SYSTEM FOR ASSISTING IN PERFORMING FINANCIAL SERVICES

TECHNICAL FIELD

Embodiments of the present invention relate to transactions between a customer and a financial institution and more particularly to a method and a system for assisting in performing financial services.

BACKGROUND ART

Financial institutions such as commercial/investment banks, insurance companies, brokerages and non-banking fund corporations etc. need to constantly engage with their customers for performing various financial services. These financial services include, but are not limited to opening an account, disbursing cash, issuing a credit/debit card, sanctioning a loan/mortgage on a property and something as basic as performing a KYC (Know Your Customer) check.

Conventional methods for performing such financial services involve an executive engaging with the customer inside an office location of the financial institution or a residence of the customer, to carry out such financial transactions. Further, after an initial exchange of information has been carried out, a number of checks, verifications and validations are performed on the exchanged information before financial transactions can be completed (such as sanctioning of a mortgage on a property). Even, with improvement in technology and introduction of solutions such as Core Banking System and Customer Relationship Management System, that have made the process of checks, verification and validations faster, the executives are still required as an interface between the financial institution and the customer, as the new technologies are confined within the boundaries of the financial institution and need expert skills for operation. This leads to the financial institution spending large amounts of money on hiring the executives and paying their monthly salaries for tasks which may not be adding a lot of value to the financial services being performed.

At least in some areas need for the executives has been minimized, i.e. for disbursement of cash, balance enquiry and deposition of cheques etc. Automated Teller Machines (ATMs) have reduced the need for the customer to actually walk into a branch of a bank, interact with an executive and fill in forms and other information, just to withdraw cash. But even operation of the ATMs need some initial training on the part of the customer, before the customer can actually perform the financial transactions. That is one of the reasons that in many developing countries, the ATMs have not been entirely accepted, especially amongst elder populations and people who are largely illiterate.

Therefore, in light of the discussion above there is a need in the art for a method and a system for assisting in performing financial services which is inherently intuitive, efficient and cost-effective.

OBJECT OF THE INVENTION

An aspect of the present invention provides a system for assisting in performing financial services.

Another aspect of the present invention provides a method for assisting in performing financial services.

SUMMARY OF THE INVENTION

Embodiments of the present invention aim to provide a method and a system for assisting in financial services. The method and the system allows for automated interaction with a user without user going through any complicated processes and steps. The method and the system utilizes visual cues, virtual interfaces and audio communication to achieve the intended objective of performing financial services. Any data that may be required or generated or required may be stored in a storage device. The method and the system allows for significant reduction in requirement of additional personnel and paper work, thereby cutting costs and reducing environmental damage.

According to a first aspect of the present invention, there is provided a method for assisting in performing financial services, the method comprising steps of receiving an image of a user from a depth sensing device, generating a virtual interface as a response to receiving the image of the user, the virtual interface comprising an intelligent virtual object, performing one or more of transmitting the virtual interface to a display device for display of the virtual interface at the display device, and transmitting an audio output to one or more speakers for provision of the audio output through the one or more speakers, receiving one or more of a gestural input from the depth sensing device, and an audio input from a microphone and performing a financial service in response to receiving one or more of the gestural input, and the audio input. The virtual interface is generated as a response to the user entering a first predetermined zone.

In one embodiment of the invention, the first predetermined zone comprises a plurality of subzones and a partition, one of the plurality of subzones having a second predetermined zone.

In one embodiment of the invention, the intelligent virtual object invites the user into one or more of the plurality of subzones using one or more of gestural actions of the intelligent virtual object and the audio output.

In one embodiment of the invention, the intelligent virtual object invites the user into one or more of the plurality of subzones using one or more of gestural actions of the intelligent virtual object and the audio output on basis of the one or more of the gestural input and the audio input.

In one embodiment of the invention, the method further comprises a step of determining a pitch angle of a face of the user, with respect to the depth sensing device, wherein the one or more of the gestural input from the depth sensing device, and the audio input from the microphone are received on a basis of the pitch angle being within a predetermined range.

In one embodiment of the invention, the method further comprises a step of modifying the virtual interface in response to receiving the one or more of the gestural input, and the audio input, upon verifying that the pitch angle is within the predetermined range and that no audio output is being provided through the one or more speakers.

In one embodiment of the invention, the method further comprises a step of receiving an image of an identification document and a plurality of identification details for verification of the user.

In one embodiment of the invention, the method further comprises a step of extracting a facial image of a face of the user.

In one embodiment of the invention, the method further comprises a step of comparing the facial image with a plurality of historical facial images stored in a storage device, for verification of the user, wherein the virtual interface is generated on a basis of historical data associated with the facial image of the user.

In one embodiment of the invention, the method further comprises a step of identifying an age and a gender of the user from the facial image and generating the virtual interface, including the virtual intelligent object, on a basis of the age and the gender of the user.

In one embodiment of the invention, the virtual interface further comprises a live image feed of the user, the live image feed being differentiated from a background in the virtual interface.

In one embodiment of the invention, the virtual interface further comprises a plurality of interface components.

In one embodiment of the invention, the step of receiving the gestural input further comprises receiving a selection of an interface component of the plurality of interface components.

In one embodiment of the invention, the method further comprises a step of providing a plurality of auxiliary indications to the user in response to receiving the one or more of the gestural input, and the audio input.

In one embodiment of the invention, the plurality of auxiliary indications is provided in order to direct the user to a particular area, the plurality of auxiliary indications being provided through connection with one or more of projectors, directional lighting fixtures and speakers, directing the user to the particular area, by means of one or more of projections, lights and sounds, respectively, and being controlled through one or more of wired and wireless means.

In one embodiment of the invention, the method further comprises a step of switching the virtual interface to an idle state during absence of the user from the first predetermined zone, wherein, in the idle state the intelligent virtual object performs predetermined activities in order to invite the user into the first predetermined zone.

According to a second aspect of the present invention, there is provided a system for assisting in performing financial services, the system comprising a depth sensing device, a microphone, a display device, one or more speakers, an interface module and a financial service module. The depth sensing device is configured to capture an image of a user and a gestural input from the user. The microphone is configured to receive an audio input. The interface module is configured to receive an image of a user from a depth sensing device, generate a virtual interface as a response to receiving the image of the user, the virtual interface comprising an intelligent virtual object, wherein the virtual interface is generated as a response to the user entering a first predetermined zone, performing one or more of transmitting the virtual interface to the display device for display of the virtual interface at the display device, and transmitting an audio output to the one or more speakers for provision of the audio output through the one or more speakers and receive one or more of a gestural input from the depth sensing device, and an audio input from a microphone. The financial service module is configured to perform a financial service in response to receiving one or more of the gestural input, and the audio input.

In one embodiment of the invention, the first predetermined zone comprises a plurality of subzones and a partition, one of the plurality of subzones having a second predetermined zone.

In one embodiment of the invention, the intelligent virtual object is configured to invite the user into one or more of the plurality of subzones using one or more of gestural actions of the intelligent virtual object and the audio output.

In one embodiment of the invention, the intelligent virtual object is configured to invite the user into one or more of the plurality of subzones using one or more of gestural actions of the intelligent virtual object and the audio output on basis of the one or more of the gestural input and the audio input.

In one embodiment of the invention, the interface module is further configured to determine a pitch angle of a face of the user, with respect to the depth sensing device, wherein the one or more of the gestural input from the depth sensing device, and the audio input from the microphone are received on a basis of the pitch angle being within a predetermined range.

In one embodiment of the invention, the interface module is further configured to modify the virtual interface in response to receiving the one or more of the gestural input, and the audio input, upon verifying that the pitch angle is within the predetermined range and that no audio output is being provided through the one or more speakers.

In one embodiment of the invention, the interface module is further configured to receive an image of an identification document and a plurality of identification details for verification of the user.

In one embodiment of the invention, the interface module is further configured to extract a facial image of a face of the user.

In one embodiment of the invention, the interface module is further configured to compare the facial image with a plurality of historical facial images stored in a storage device, for verification of the user, wherein the virtual interface is generated on a basis of historical data associated with the facial image of the user.

In one embodiment of the invention, the interface module is further configured to identify an age and a gender of the user from the facial image and generating the virtual interface, including the intelligent virtual object, on a basis of the age and the gender of the user.

In one embodiment of the invention, the virtual interface further comprises a live image feed of the user, the live image feed being differentiated from a background in the virtual interface.

In one embodiment of the invention, the virtual interface further comprises a plurality of interface components.

In one embodiment of the invention, for receiving the gestural input, the interface module is further configured to receive a selection of an interface component of the plurality of interface components.

In one embodiment of the invention, the interface module is further configured to provide a plurality of auxiliary indications to the user in response to receiving the one or more of the gestural input, and the audio input.

In one embodiment of the invention, the plurality of auxiliary indications is provided in order to direct the user to a particular area, the plurality of auxiliary indications being provided through connection with one or more of projectors, directional lighting fixtures and speakers, directing the user to the particular area, by means of one or more of projections, lights and sounds, respectively, and being controlled through one or more of wired and wireless means.

In one embodiment of the invention, the interface module is further configured to switch the virtual interface to an idle state during absence of the user from the first predetermined zone, wherein, in the idle state the intelligent virtual object is configured to perform predetermined activities in order to invite the user into the first predetermined zone.

In the context of the specification, the term "depth sensing device" refers to any device capable of performing range imaging through which the device is capable of collecting electromagnetic radiation signals that allow measurement of distance of several points in an environment from a common reference point (such as the position of the device). In that manner, the device may deploy a number of techniques for depth sensing such as, but not limited to, stereo triangulation, sheet of light triangulation, structured light, time-of-flight, interferometry, coded aperture and machine learning algorithms such as hit-test etc.

In the context of the specification, the term "image" refers to an image having a single frame or multiple frames collected over a time period. Further, the image may be a 2-Dimensional image or a 3-Dimensional image including depth data, such as that captured by the "depth sensing device" (for range imaging), in order to allow generation of 3-Dimensional representations of a scene being captured and determination of distances between any two points. Where, the image is a 2-Dimensional image, algorithms, such as, but not limited to, "hit-test" may be deployed in order to determine distances between any two points in the image.

In the context of the specification, the term "virtual interface" refers to any audio-visual representation and exchange of information and signals using one or more of imaging devices, microphones, display devices and/or speakers.

In the context of the specification, the term "microphone" refers to any device used for capturing of sound that may be present in the art or may be developed in foreseeable future.

In the context of the specification, the term "intelligent virtual object" refers to a graphical representation of a virtual or a real agent that may be embedded with predefined scripts and responses for interacting with human beings for performing certain services and may also be able to generate newer scripts and responses through machine learning algorithms. The intelligent virtual objects may also be capable of responding to gestural inputs and audio inputs and their responses may include gestures and audio outputs. The intelligent virtual objects may also be supported by image processing and natural language processing algorithms to perform their functions.

In the context of the specification, the term "gestural input" refers to one or more of any kind of physical movement of a user in form of movement of a hand, head, legs or any other part of the body or movement of the entire body, depending upon a specific requirement of an application or design of the present invention. Further, the gestural input may or may not involve direct contact with a display device, such as a screen or a projection.

In the context of the specification, the term "financial services" refers to services offered by financial institutions to their customer's such as provision of different tasks, actions and processes related to areas such as providing information about products, navigational directions for the area, enabling the user to sign up or register for products, recording feedback and administering feedback surveys, enabling social media marketing and conducting or initiating financial transactions, enabling KYC know your customer related tasks etc.

In the context of the specification, the term "interface component" refers to a graphical representation of a real world article such as, but not limited to, a button or a lever or a toggle or switch etc. displayed on a display device, that when selected with or without direct contact may lead to, but not limited to, performance of a specific task or generation and display of additional such interface components etc.

In the context of the specification, the term "historical" in execution of a command refers to anything pertaining to a time instant(s) that is earlier than a time instant of an initiation of the command.

In the context of the specification, the term, "real-time", refers to without intentional delay, given the processing limitations of hardware/software/firmware involved and the time required to accurately measure/receive/process/transmit data as practically possible.

BRIEF DESCRIPTION OF THE ACCOMPANYING DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE PREFERRED EMBODIMENTS

Figure 1A:
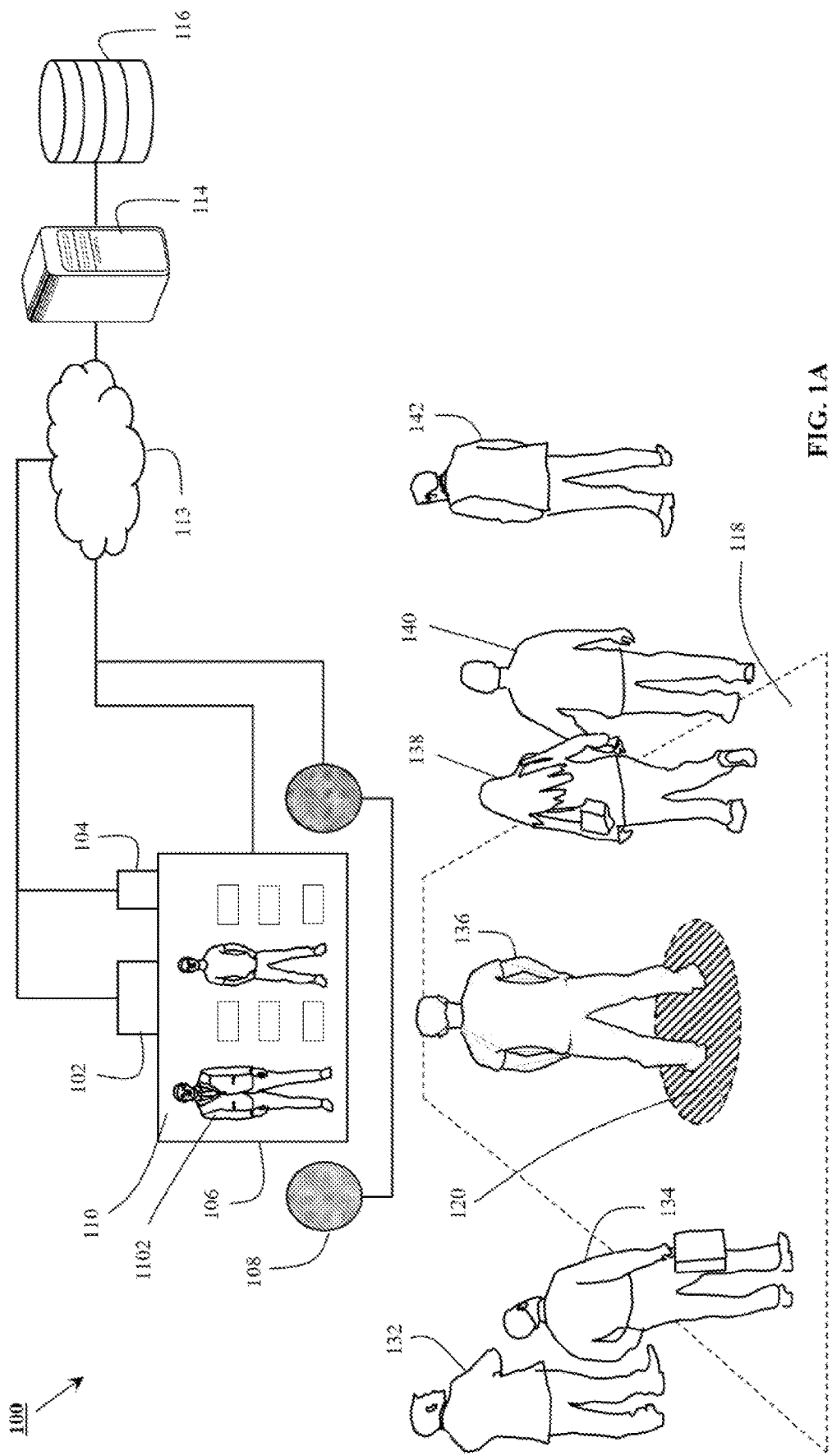
FIG. 1A illustrates an exemplary environment of devices to which various embodiments of the present invention may be implemented.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claim. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is understood that we also contemplate the same composition, element or group of elements with transitional phrases "consisting of", "consisting", "selected from the group of consisting of, "including", or "is" preceding the recitation of the composition, element or group of elements and vice versa. The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

In order to perform financial service with minimal involvement of human agents, imaging devices such as depth sensing cameras and audio input devices such as microphones may be deployed to receive an input from a user. The input may be in form of gestures or audio commands. To further interact with the user, a virtual interface may be generated and provided to the user through display devices and speakers. The virtual interface may also include an intelligent virtual object, a graphical representation of a real or a virtual agent that may interact with the user to provide the user a more personal experience while performing financial services. The performance of financial service in turn may also be aided through a number of graphical elements displayed within the virtual interface and audio outputs and may deploy use image processing and natural language processing.

Referring to the drawings, the invention will now be described in more detail. FIG. 1A illustrates an exemplary environment 100 of devices to which various embodiments of the present invention may be implemented. As shown in FIG. 1, the environment 100 comprises a depth sensing device 102. In one embodiment of the invention, the depth sensing device 102 comprises an emitter and receiver pair. The emitter is configured to emit infrared radiations which are reflected by an object in the environment 100 and received at the receiver. The depth sensing device 102 uses Time-of-Flight (ToF) information, i.e. time taken by the infrared radiation between being emitted from the emitter and being received at the receiver. The depth sensing device 102 combines the ToF value with video information to generate accurate 3-Dimensional (3D) representations of the object. In another embodiment, the depth sensing device 102 may emit light in a structured pattern, such as a grid. The structure of the grid will be distorted by the 3D shape of the object. This distortion may be analysed by the depth sensing device 102 to generate the 3D representation of the object.

In yet another embodiment, the depth sensing device 102 comprises an array of cameras provided at predetermined offsets. A plurality of 2-Dimensional (2D) images captured by the array of cameras are combined, for example by triangulation, to generate the 3D representation of the object. This technology therefore involves stereoscopic vision systems. In yet another embodiment, the depth sensing device 102 comprises a 2D camera converted into the depth sensing device 102 with help predefined hardware modifications and machine learning algorithms. These 3D representations when applied to humans can be used to identify gestures and change in facial expressions etc. Further, the environment 100 comprises a microphone 104 configured to receive audio inputs in the environment 100.

An area where the depth sensing device 102 can perceive depth and differentiate between different objects is depicted as a first predetermined zone 118 also referred to as a zone of interaction wherein any person physically present in the zone of interaction 118 can be recognized as a generic person by the depth sensing device 102. As can be seen from FIG. 1A, there may be several persons 132, 134, 136, 138, 140 and 142 who may be within or outside the zone of interaction 118. Further, an area within the zone of interaction 118 where a person can interact with the virtual interface 110 is depicted as a second predetermined zone 120, also referred to as an optimal zone.

Further, the environment 100 comprises a display device 106. The display device 106 is one of, but not limited to, an LCD screen, an LED screen and a screen for receiving a visual projection from a projector. The display device 106 is configured to display a virtual interface 110 which may consist of an intelligent virtual object 1102, an onscreen representation of a user and various digital objects and interface components. The intelligent virtual object 1102 may depict any form such as, but not limited to, a human, an animal and a cartoon character etc. It is contemplated that through a connection from a server 114 the virtual interface 110 is displayed on the display device 106 utilizing the intelligent virtual object 1102 the onscreen representation of the user and various digital objects and interface components. Further, the environment 100 comprises one or more speakers 108 configured to provide audio output in the environment 100. The display device 106 and the one or more speakers 108 may be in a combined form factor or as separate independent units.

Each one of the depth sensing device 102, the microphone 104, the display device 106 and the one or more speakers 108 are connected to the server 114 associated with a financial institution, through a network 112. The network 112 is one of, but not limited to, direct connectivity of the server 112 via wires and connectors such as USB, HDMI, VGA, or wireless connectivity such as Bluetooth or Wi-Fi or Local Area Network (LAN) or Wide Area Network (WAN) implemented through TCP/IP, IEEE 802.x, GSM, CDMA or other equivalent protocols. In that manner, it is contemplated that the server 114 may be located in the same location as the depth sensing device 102, the microphone 104, the display device 106 and the one or more speakers 108 or may be located at a remote location such as a cloud data centre. It is to be noted here that the server 114 has been depicted as a single device for simplicity of discussion. However, a person skilled in the art would appreciate that the server 114 may be replaced by a system of servers arranged in form of server farms or server stacks having multiple layers of security (firewalls and public key encryptions etc.) there between.

Figure 1B:
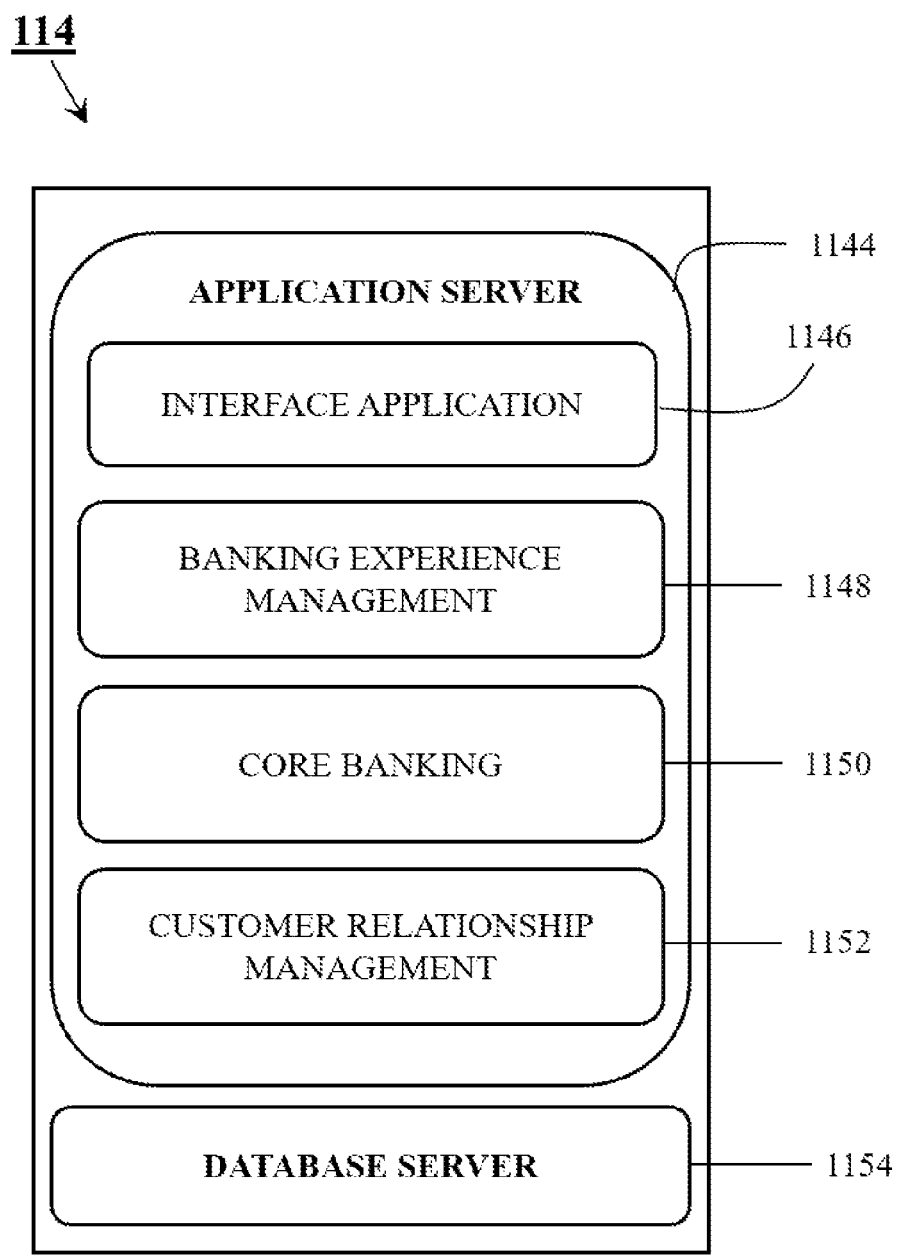
FIG. 1B illustrates an exemplary server in accordance with an embodiment of the present invention.

FIG. 1B illustrates the server 114 in accordance with an embodiment of the present invention. Here, the financial institution being referred to is a bank. The server 114 is contemplated to have multiple capabilities, including but not limited to, an application server 1144 and a database server 1154. The application server 1144 hosts a number of applications for enablement of the present invention. Some of these applications include, but are not limited to, an interface application 1146 which may create augmented reality and/or virtual reality interfaces configured to generate the virtual interface which includes the intelligent virtual object 1102 in Virtual Reality Modelling Language (VRML), X3D or other equivalent languages or playback of recorded video or sequence of captured images with or without modifications and enhancements, such as a video being played in background. Additionally, the application server 1144 hosts a number of applications or is connected to other servers which are a part of modern day banking, such as, Banking Experience Management application 1148, Core Banking application 1150, Customer Relationship Management application 1152. All these applications generate large amounts of data which may be segregated into a number of tables for various purposes.

Along with storing name, contact details, account details and transaction history etc. of each customer, these applications also perform data analytics for example, for targeting right kind of customers for right products, providing special offers to customers and tracking repayment of loans and mortgages etc. These huge chunks of data and their respective tables are stored in form of a plurality of databases in a storage device 116 depicted in FIG. 1A. The storage device 116 may be a local storage device or a remote storage device such as a cloud based storage device. The database server 1154 manages these databases and provides required data, from the storage device 116, whenever needed by the application server 1144. Several embodiments of the present invention may now be understood taking the exemplary environment 100 as a reference.

Figure 1C:
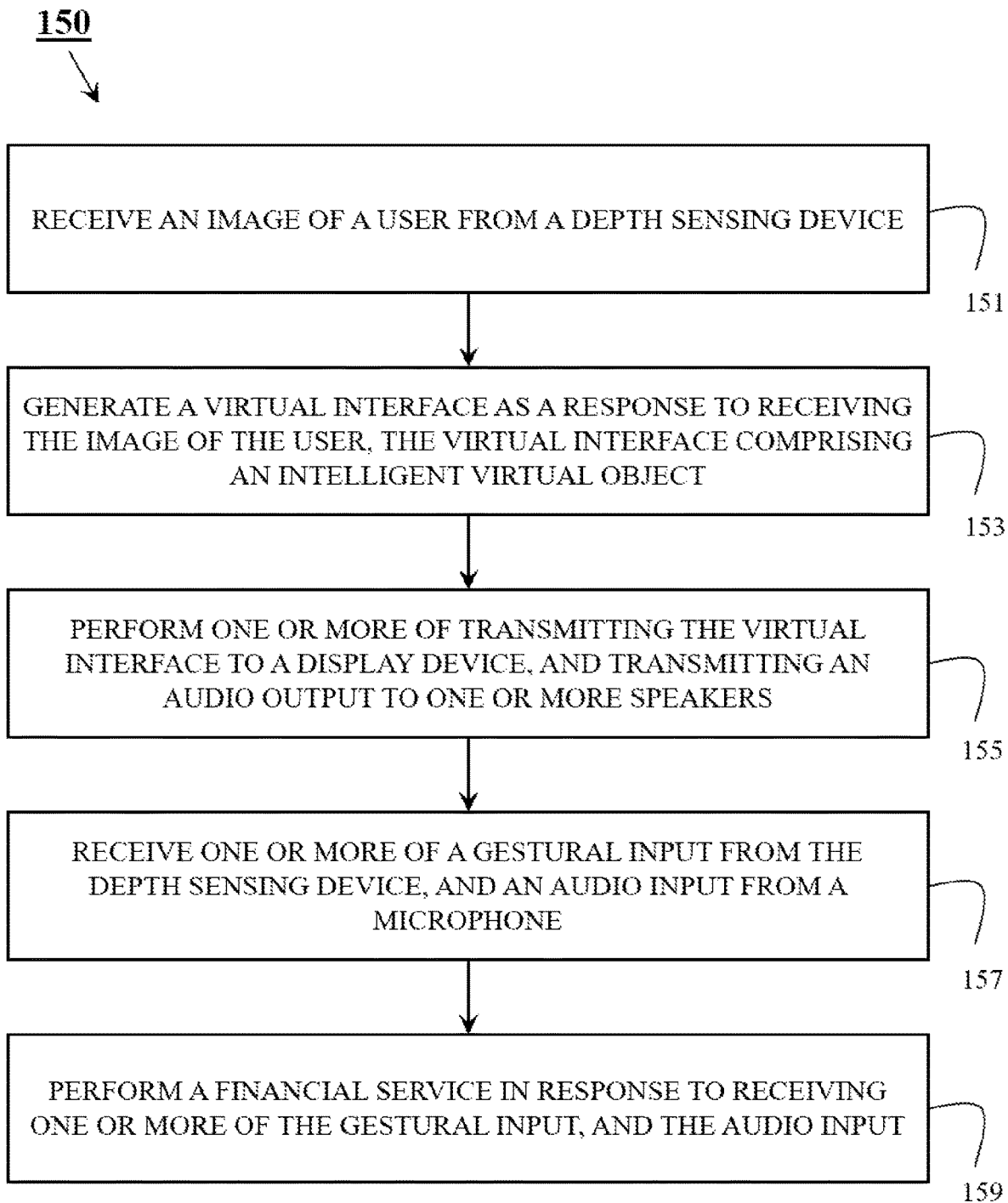
FIG. 1C illustrates a method for assisting in performing financial services, in accordance with an embodiment of the present invention.

FIG. 1C illustrates a method 150 for assisting in performing financial services, in accordance with an embodiment of the present invention. The method begins at step 151 when the depth sensing device 102 captures an image of a user in field of view of the depth sensing device 102 and transmits the captured image to the server 114. The server 114 in turn receives the image of the user from the depth sensing device 102.

Figure 2:
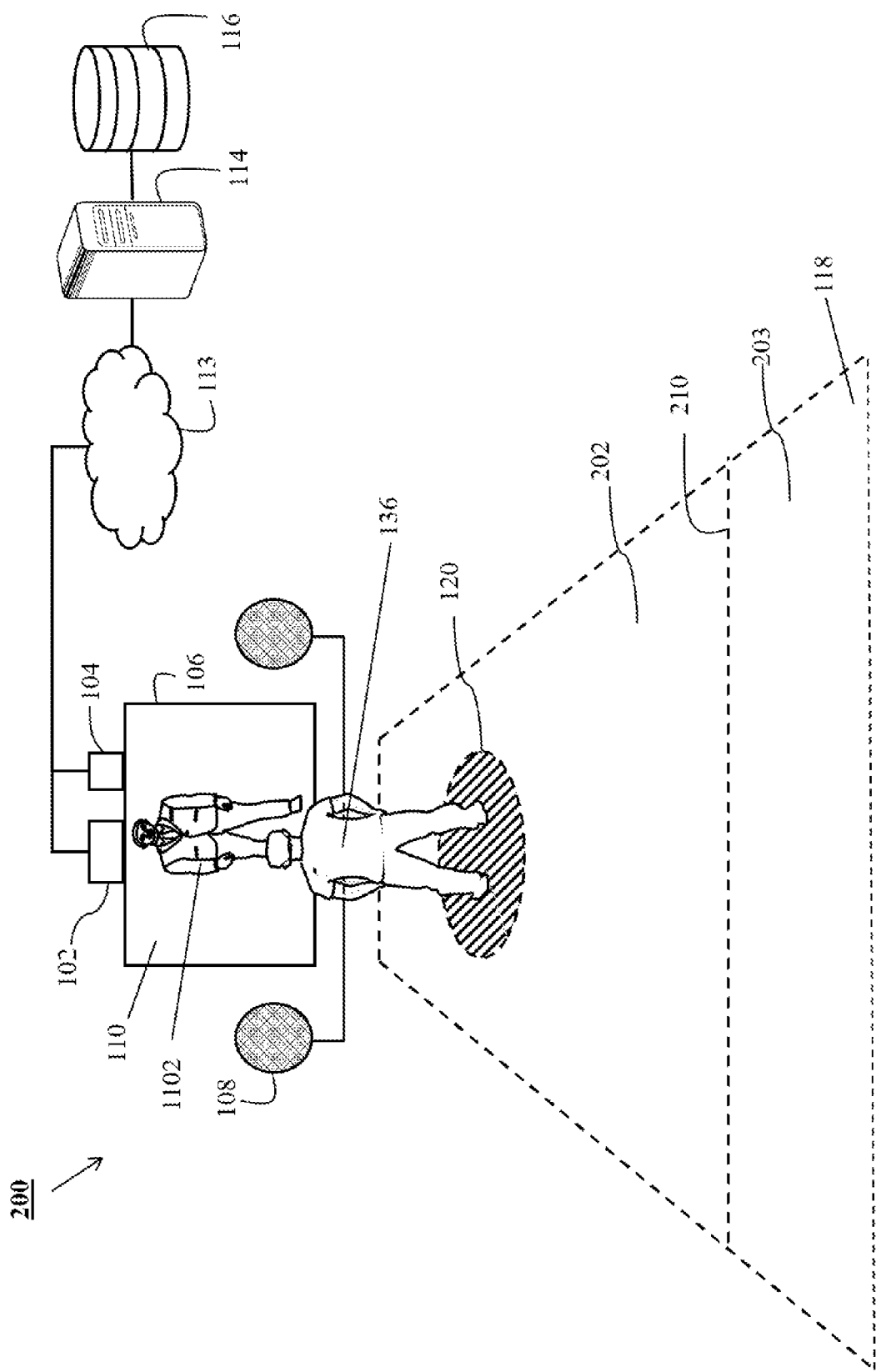
FIG. 2 illustrates exemplary subzones in the environment in accordance with an embodiment of the present invention.

FIG. 2 illustrates exemplary subzones in the environment 100 in accordance with an embodiment 200 of the present invention. As shown in FIG. 2, the environment 100 depicts a plurality of sub zones 201, 202, 203 wherein the depth sensing device 102 captures 3D or 2D image of the user 136 in the zone of interaction 118. Within the zone of interaction 118, there may be a partition 210, which may be transparent such as, but not limited to, glass partitions or glass walls. Further, the partition 210, can be symbolic in nature to show the change in flooring or simple demarcation in any form. Such partition 210, may be used to segregate an area within the zone of interaction 118 from other areas such as, but not limited to, a corridor. The partition 210 may either have a doorway or opening within the zone of interaction 118 allowing the user 136 to move directly from a subzone 203 to a subzone 202. The server 114 monitors the presence of the persons in general in the zone of interaction 118 and including movement of the user 136 through the sub zones 201, 202, 203.

At step 153, the virtual interface 110 is generated as a response to receiving the image of the user 136. As mentioned above, the virtual interface 110 includes the intelligent virtual object 1102. However, the virtual interface 110 is generated as a response to the user 136 entering the first predetermined zone 118.

At step 155, one or more of transmitting the virtual interface 110 to the display device 106 for display of the virtual interface 110 at the display device 106, and transmitting an audio output to the one or more speakers 108 for provision of the audio output through the one or more speakers 108, is performed by the server 114. In one embodiment of the invention, the intelligent virtual object 1102 invites the user into one or more of the plurality of subzones 202, 203 using one or more of gestural actions of the intelligent virtual object 1102 and the audio output. For example, as the user 136 enters in the subzone 203, the virtual interface 110 displayed on the display device 106, using the gestural actions of the intelligent virtual object 1102 or other text displayed on the display device 106 or audio output from speakers 104 or combinations thereof, invites the user from the subzone 203 to enter subzone 202 and come closer to the second predetermined zone 120.

When the user 136 enters from the subzone 203 to the subzone 202, the virtual interface 110 displayed on the display device 106 using gestural actions of the intelligent virtual object 1102 displayed on the display device 106 interacts with the user 136 visually and through the audio coming from the one or more speakers 108 informing the user 136 of stepping into the second predetermined zone 120, in order to start controlling the virtual interface 110 shown on the display device 106 with the user's gestures and voice. The interaction can also be done by, but not limited to, visual pointers, directions and clues displayed on the display device 106 that may guide the user to enter into the second predetermined zone 120. Further, the subzone 201 may be demarcated by, but not limited to, special stickers, a spotlight showcasing the second predetermined zone 120 or a visual clue on the display device 106 etc.

At step 157, one or more of a gestural input from the depth sensing device 102, and an audio input from the microphone 104 is received at the server 114. In this case too, the intelligent virtual object 1102 may invite the user into the one or more of the plurality of subzones 202, 203, such as the second predetermined zone 120, using the one or more of gestural actions of the intelligent virtual object 1102 and the audio output, on basis of the one or more of the gestural input and the audio input. Once the user 136 is present in the second predetermined zone 120, the virtual interface 110 displayed on the display device 106 provides a plurality of interface components to complete bank tasks, transactions and processes.

Figure 3:
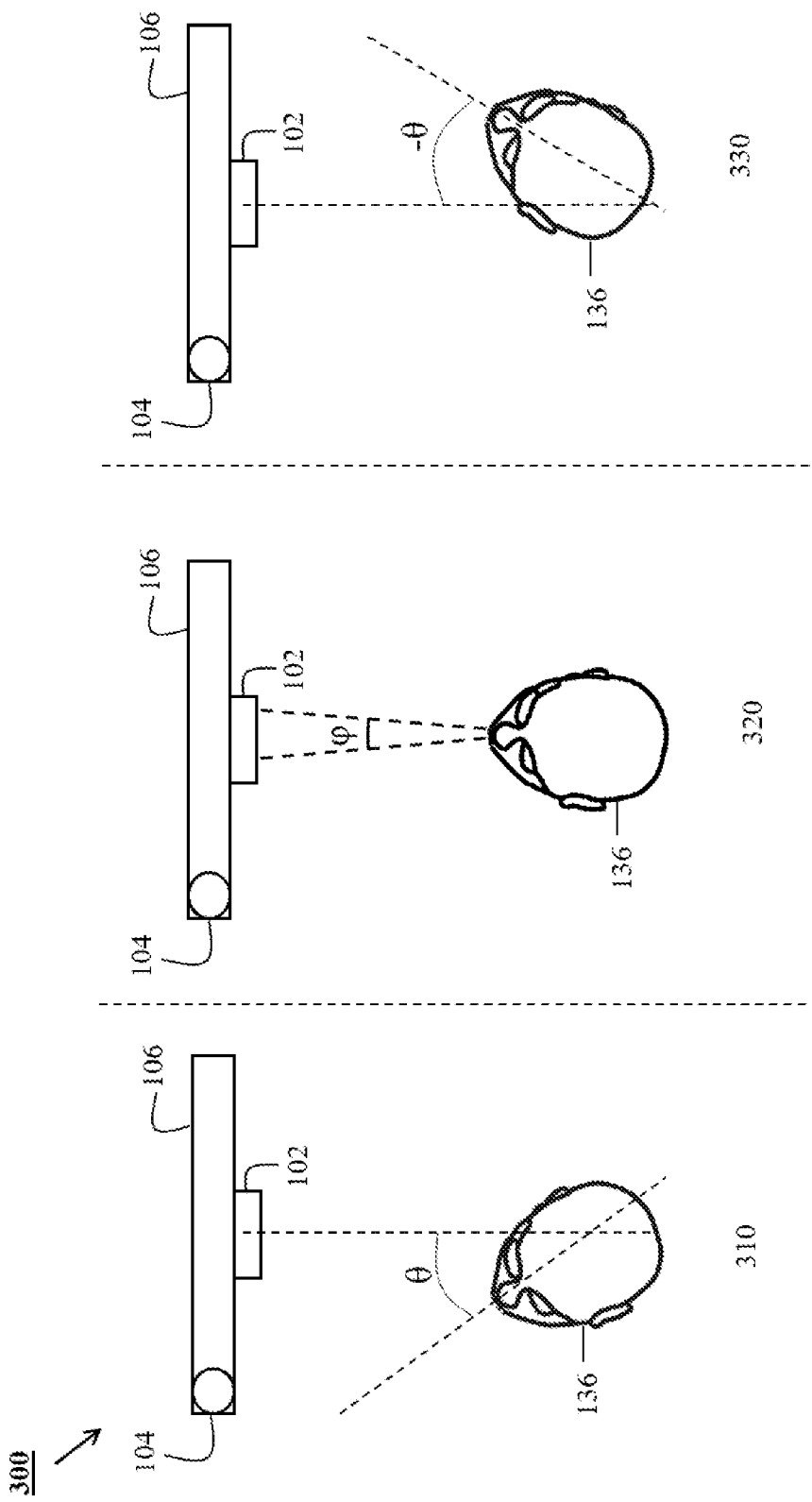
FIG. 3 illustrates a user in front of a depth sensing device, in three different scenarios, in accordance with an embodiment of the present invention.

FIG. 3 illustrates the user 136 in front of the depth sensing device 102, in three different scenarios 310, 320 and 330, in accordance with an embodiment 300 of the present invention. As shown in FIG. 3, the depth sensing device 102 transfers the captured 3D or 2D image of the user 302 to the server 114. The server 114 calculates an accurate pitch angle of the direction the head of the user is facing to the display device 106 and determines if the user 136 is interested to interact with the virtual interface 110. The pitch angle of the face of the user 136 is calculated for every frame sent by depth sensing device 102 to the server 114. The depth sensing device 102 provides such depth data at a rate of multiple frames per second or one frame per second or one frame over several seconds.

As shown in scenario 310, the user 136 is looking/staring at the left of the display device 106 creating some pitch angle ($\theta$) with the display device 106. In scenario 320, the user 136 is looking straight at the display device 106. Therefore, creates a zero value pitch angle with the display device 106. In scenario 330, the user 136 is looking at the right of the display device 106 creating a pitch angle ($-\theta$) with the display device 106. It is seen that the angle from shoulder or the position of rest of the body of the user 136 may or may not have any effect on the calculation of the pitch angle of the face of the user 136. If the pitch angle of the face of the user exceeds a certain value to the left or to the right, the server 114 considers that the user 136 is currently not interacting with the virtual interface 110 and stops reacting to the user's gestural and/or audio input till the pitch angle of the face of the user is within a predetermined range ($\varphi$). For instance, if the user 302 is interacting with the virtual interface 110 through the gestural and/or the audio input and then starts to interact with the user beside him/her. At this point, the virtual interface 110 stops reacting to the user's the gestural and/or the audio input as the pitch angle is increased beyond the predetermined range ($\varphi$).

Figure 4:
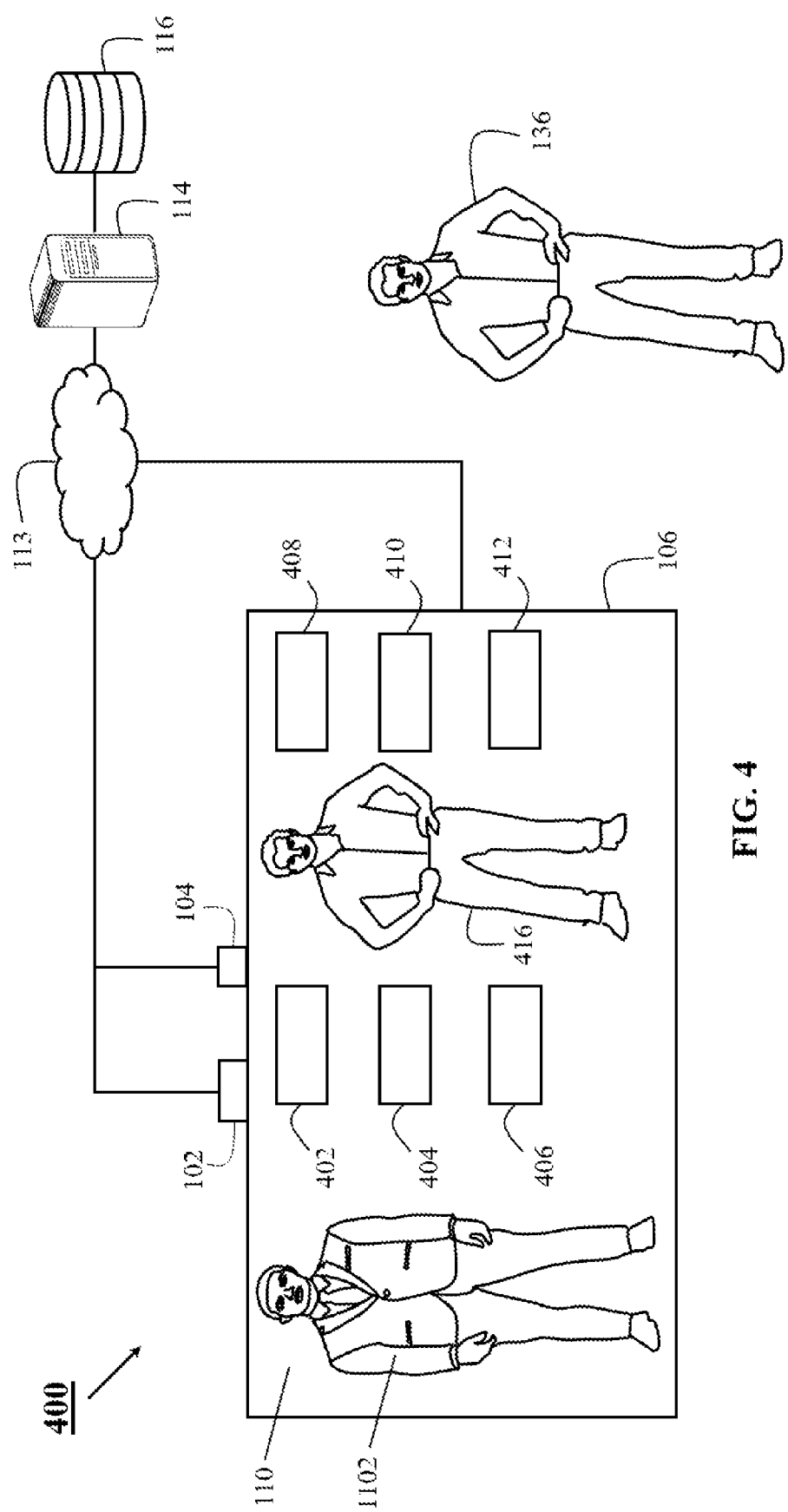
FIG. 4 illustrates a display device depicting a plurality of interface components, in accordance with another embodiment of the present invention.

FIG. 4 illustrates the display device 106 depicting a plurality of interface components 402, 404, 406, 408, 410 and 412, in accordance with another embodiment 400 of the present invention. As shown in FIG. 4, the user 136 can see a live image feed 416 of himself/herself in the display device 106 when the user 136 is in the second predetermined zone 120 of the first predetermined zone 118. The number and positions of the interface components are not fixed. The live image feed 416 comes from the depth sensing device 102 that is communicating directly with the server 114. A 2-Dimensional camera may also aid the depth sensing device 102 in generating the live image feed 416. The display device 106 displays the live image feed 416 and a background. The server 114 differentiates the live image feed 416 from his/her background by, but not limited to, showing different colour in the background and to the user image. The live image feed 416 may be shown in colour and the background can be shown in greyscale. Alternatively, background may be completely made up of any image or colour of choice, keeping the live image feed 416 as is or doing some enhancements or modifications to the live image feed 416. Additionally, the intelligent virtual object 1102 is shown as part of the virtual interface 110. Further, the server 114 generates the virtual interface 110 and displays the virtual interface 110 on the display device 106.

As mentioned above, the server 114 receives the one or more of the gestural input from the depth sensing device 102, and the audio input from the microphone 104. Further, the virtual interface 110 includes the plurality of interface components 402, 404, 406, 408, 410 and 412 along with the intelligent virtual object 1102, which are displayed to the user 136 and interaction with the user 136 is carried out based on the gestural input and/or the audio input in form of voice commands.

The intelligent virtual object 1102 may appear at any place on the display device 106 to interact with the user 136. However, the virtual interface 110 may be switched to an idle state during absence of the user from the first predetermined zone 118. When in idle state the intelligent virtual object 1102 may or may not make subtle movements of activity. In the inviting state the intelligent virtual object 1102 performs predetermined activities in order to invite the user from the first predetermined zone 118 into the second predetermined zone 120. If required, the intelligent virtual object 1102 may remain on the virtual interface 110, once it is done talking and gesturing, in the idle state waiting for the user 136 to interact with the virtual interface 110 via voice or gesture with or without touch. After a certain period of inactivity or if the server 114 feels that the user 136 is not engaging or interacting with the virtual interface 110 then it may trigger the intelligent virtual object 1102 to assist the user through gesture and voice or audio output.

The user 136 can move his/her hands to select one or more of the plurality of interface components 402, 404, 406, 408, 410 and 412 displayed on the display device 106. As the user 136 changes his position in the field of view of the depth sensing device 102 the interface components 402, 404, 406, 408, 410 and 412 can also automatically move so as to remain at a reasonably comfortable and reachable distance from the live image feed 416 of user. User 136 may move any of his hands in the air such that mirror live image feed 416 has its hand over any interface components 402, 404, 406, 408, 410 and 412 to select the same. The interface components 402, 404, 406, 408, 410 and 412 may have the facility to get selected after a certain period of time has passed since the live image feed 416's hand moved over the relevant floating object.

An animation of the passage of this period of time may also be shown on the respective interface component which is being hovered over the by any hand of the live image feed 416. The selection of the plurality of interface components 402, 404, 406, 408, 410 and 412 results in some activity and/or combination of activities triggering that includes, but not limited to, the intelligent virtual object 1102 speaking and/or gesturing, display of a plurality of further interface components or other vide or textual content on the display device 106 or a video playing on any display device or sounds playing through any speakers 108 or any new interface opening on any display device to the user 136 or an activation and a deactivation of lights. The server 114 may also modify the virtual interface 110, from time to time, in response to receiving the one or more of the gestural input, and the audio input, upon verifying that the pitch angle is within the predetermined range (qc) and that no audio output is being provided through the one or more speakers 108. That way, the virtual interface 110 only gets modified when the user is deemed to be interested in interacting with the virtual interface 110 and no other process is performed by the intelligent virtual object 1102.

In several embodiments, a plurality of auxiliary indications may also be provided to the user 136, in response to receiving the one or more of the gestural input, and the audio input. For example, the user may also speak certain commands instead of undertaking gestural activity which are then picked up by the microphone 104 and processed by the server 114 resulting in some activity and/or combination of activities triggering that includes, but not limited to, the intelligent virtual object 1102 speaking, display of a plurality of further interface components of the virtual interface 110 to the user 136 and an activation and a deactivation of auxiliary indicators such as lights.

In one embodiment of the invention, the plurality of auxiliary indications is provided in order to direct the user to a particular area. For instance, if the intelligent virtual object 1102 is directing the user 136 to a particular area of location based on the gestural input of the user 136, the auxiliary indicators such as the lights and sounds can be switched on for a particular area directing the user 136 there. The lights could be, but not limited to, in the form of arrows guiding the user 136. The hardware controlled may be connected to the server 114 via wires or wireless methods such as Bluetooth or Wi-Fi. Further, the microphone 104 receives the audio input from the user 136. The intelligent virtual object 1102 provides the audio output by the one or more speakers 108. There may be other audio output as well sent by the server 114 to communicate certain information to the user 136.

Figure 5A:
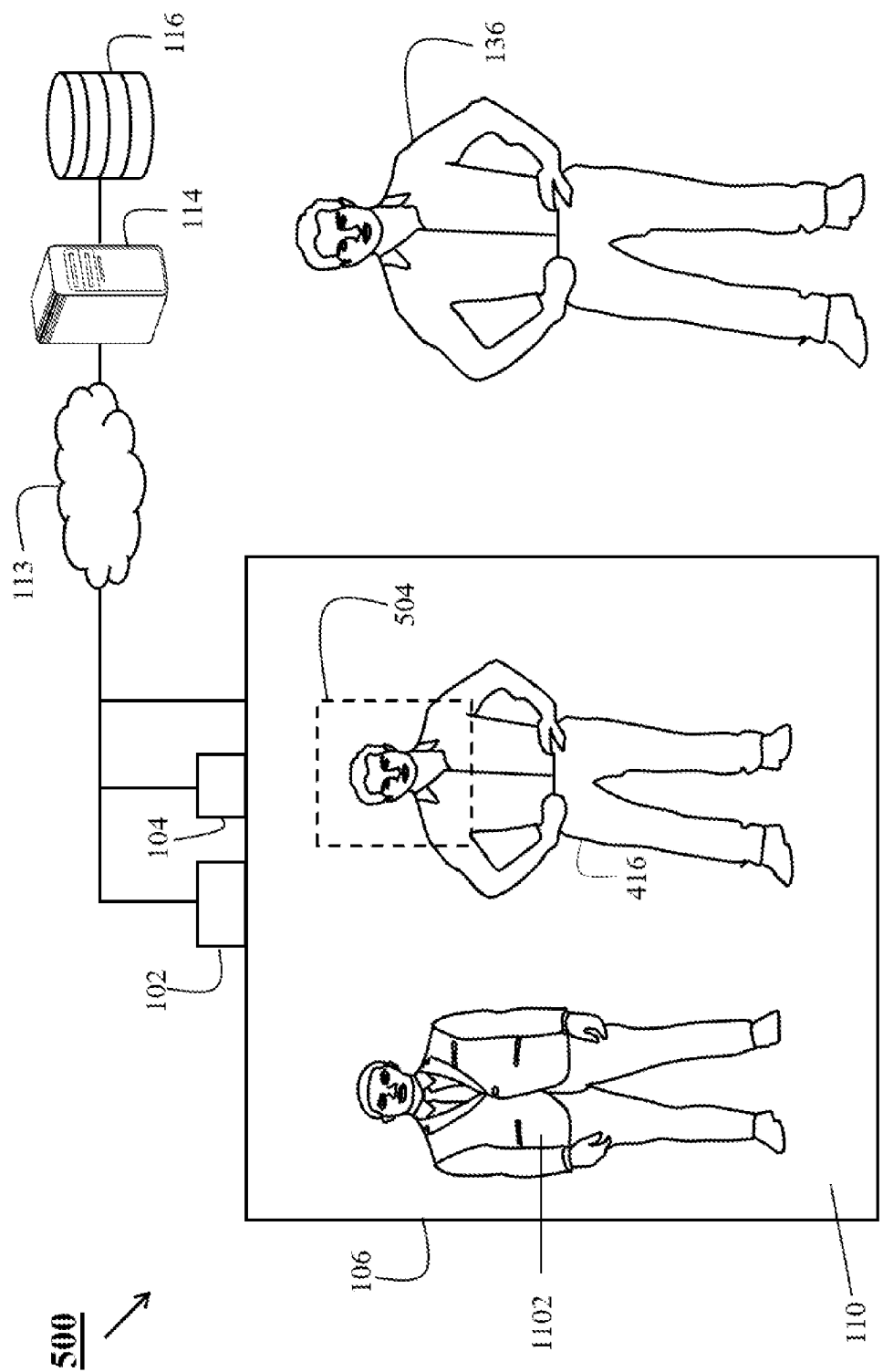
FIG. 5A illustrates a process of capturing a facial image of the user, in accordance with an embodiment of the present invention.
Figure 5B:
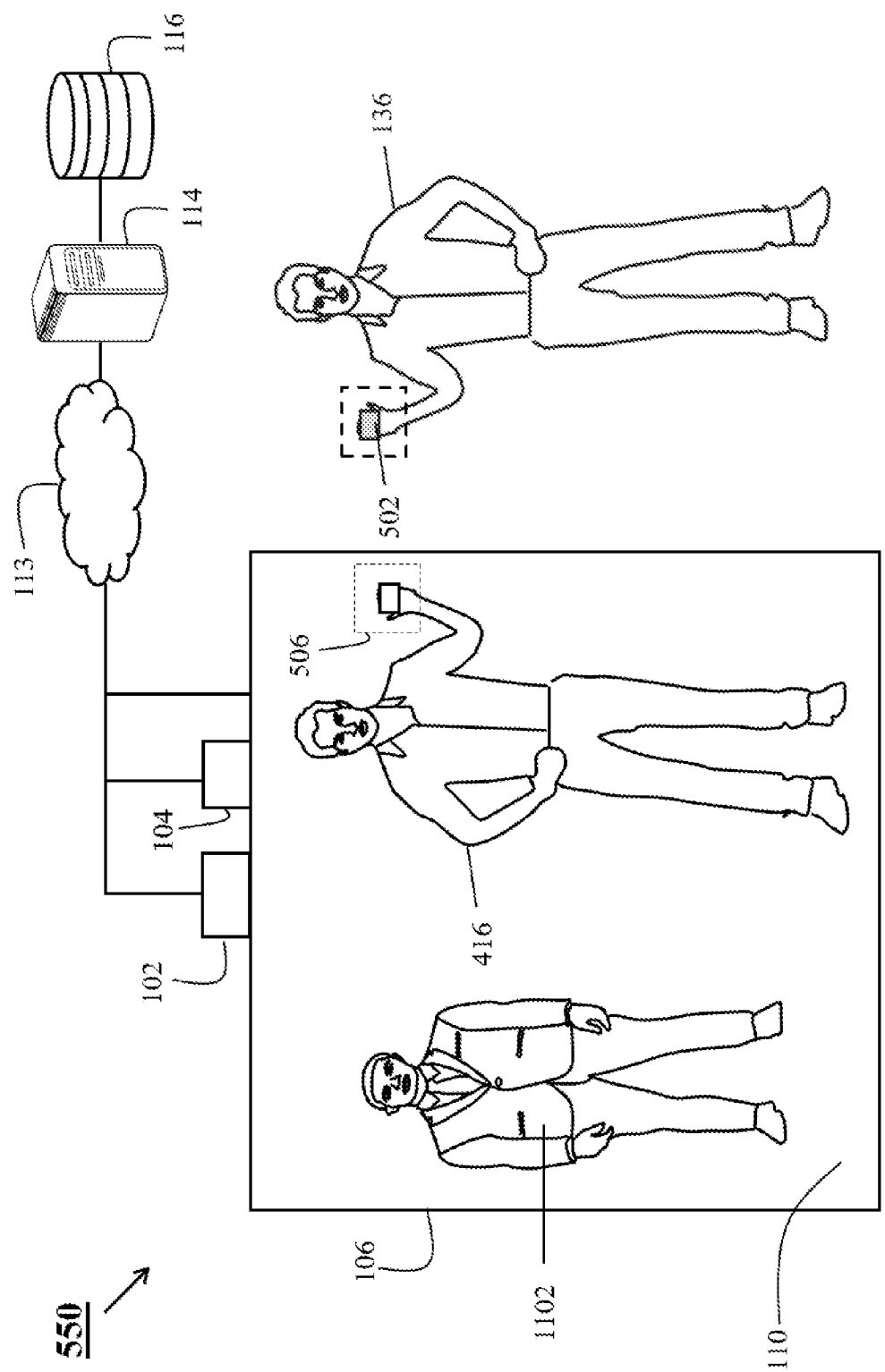
FIG. 5B illustrates the user displaying a document to the depth sensing device for performing a financial verification, in accordance with an embodiment of the present invention.

At step 159, a financial service is performed in response to receiving one or more of the gestural input, and the audio input at the server 114. FIGS. 5A and 5B illustrate two processes 500 and 550 respectively, that the user 136 does for performing a financial verification which includes, but is not limited to, opening of a bank account or signing up for a financial product, or sign up for a credit or debit card, complete any Know Your Client (KYC) process, or any other form of registration or verification in accordance with an embodiment of the present invention. The processes 500 and 550 may be conducted in any order and can be included as a part of a larger set of processes conducted in any order for the above mentioned financial verification. In one embodiment of the invention, the depth sensing device 102 captures the facial image of the user by differentiating the two dimensional and three dimensional data. The facial image extraction involves capturing the three dimensional depth data of the user. The depth data involves capturing the bone structure of the user's face. The bone structure of every individual being unique, serves as an important tool for depth data identification of the user. Also, in the present invention the depth sensing device is able to differentiate between the 2D photograph and 2D video of a human from the 3D presence of an actual human user. The present invention can also differentiate human users from inanimate objects in the background. Thus ensuring the presence of the user in the present physical environment and providing a more secure platform for performing financial services.

FIG. 5A illustrates a process 500 of capturing a facial image of the user 136, in accordance with an embodiment of the present invention. 3D or 2D image data from the depth sensing device 102 will be used to extract a facial image of the user 136 and may also show the live image feed 416 of the user 136 in the display device 106 as a part of the virtual interface 110. The virtual interface 110 may also highlight or bring emphasis to region 504 in some manner to show user 136 that his face has been selected and captured by the process. However, it is to be noted that displaying the live image feed 416 or highlighting region 504 in some manner is not necessary for the process of capturing of the image of the face of the user 136. The same can also be done without showing the same.

In one embodiment of the invention, the facial image is compared with a plurality of historical facial images stored in the storage device 116, for verification of the user 136. The facial image of the face of user 136 could be compared against the photo of the face of user 136 or against any other labelled or non-labelled store of photos for verification or comparison or identity matching. In that manner, the virtual interface 110 may also be generated on a basis of historical data associated with the facial image of the user.

FIG. 5B illustrates the user 136 displaying an identification document to the depth sensing device 102 for performing a financial verification. As shown in FIG. 5B, the depth sensing device 102 captures the identification document as an identity proof 502 of the user 136. The identity proof 502 is then transferred to the server 114. The identity proof 502 is, but not limited to, a document or a proof which may possess a plurality of identification details such as written words in any language or a photo or any form of a symbol, a diagram, a barcode, a QR code or combinations thereof. The server 114 verifies the identity of the user 136 from a pre-determined set of data stored in the memory or the storage device 116. This involves conversion of the data present on document to the machine understandable format. If the image of document 502 contains any photo with a face it may be compared against the photo of the face of user 136 taken in process outlined in FIG. 5A or against any other labelled or non-labelled store of images for verification or comparison or identity matching purposes.

The captured images of the document 502 and/or of face of user 136 may be stored in any non-transitory computer-readable storage medium in any format whatsoever. The process may also involve conversion of the image of written words on document 502 to a machine readable format. Once the image of written words is converted to the machine-readable format they can be used to verify or compare against any remote or non-remote information stored in any database or non-transitory computer-readable storage medium storing relevant information like application server 1144 or database server 1154 or external databases such as but not limited to a government system.

The display device 106 may also highlight or bring emphasis to region 506 in some manner to show that document 502 has been selected and captured by the process. However, it is to be noted that displaying the live image feed 416 or highlighting region 506 in some manner is not necessary for the process of capturing of the image of the document 502 shown by the user 136. The same can also be done without displaying the live image feed 416 or the highlighting region 506. Further, the virtual interface 110 displayed on the display device 106 including the intelligent virtual object 1102 allows the user 136 to opt the plurality of interface components 402, 404, 406, 408, 410 and 412. Further, the plurality of interface components 402, 404, 406, 408, 410 and 412 may be related to, but not limited to, open a bank account, sign up for a credit card and/or debit card, complete know your client (KYC) process. For instance, if the user 136 comes for the first time then the real time data is stored in the memory.

In accordance with an embodiment of the present invention, the pre-determined data and the real data is stored in non-transitory computer-readable storage medium. Additional information can be collected via an audio input or by typing input. Typing input can be via a touch screen interface or a physical interface such as keyboard. The additional hardware of the touch screen or physical keyboard can either be attached or part of the display device 106 or can be independently present and communicate with the server 114 through wired or wireless communication protocols.

Additionally, upon the return of such user 136 in front of the depth sensing device 102 the server 114 could then be able to match the face of the user with the information the user 136 entered earlier and customize and personalize the virtual interface 1102 including the text and video recording of the virtual intelligent object 1102 for the particular user by for instance greeting him by name or displaying products and services which may be more relevant to the user.

Figure 6A:
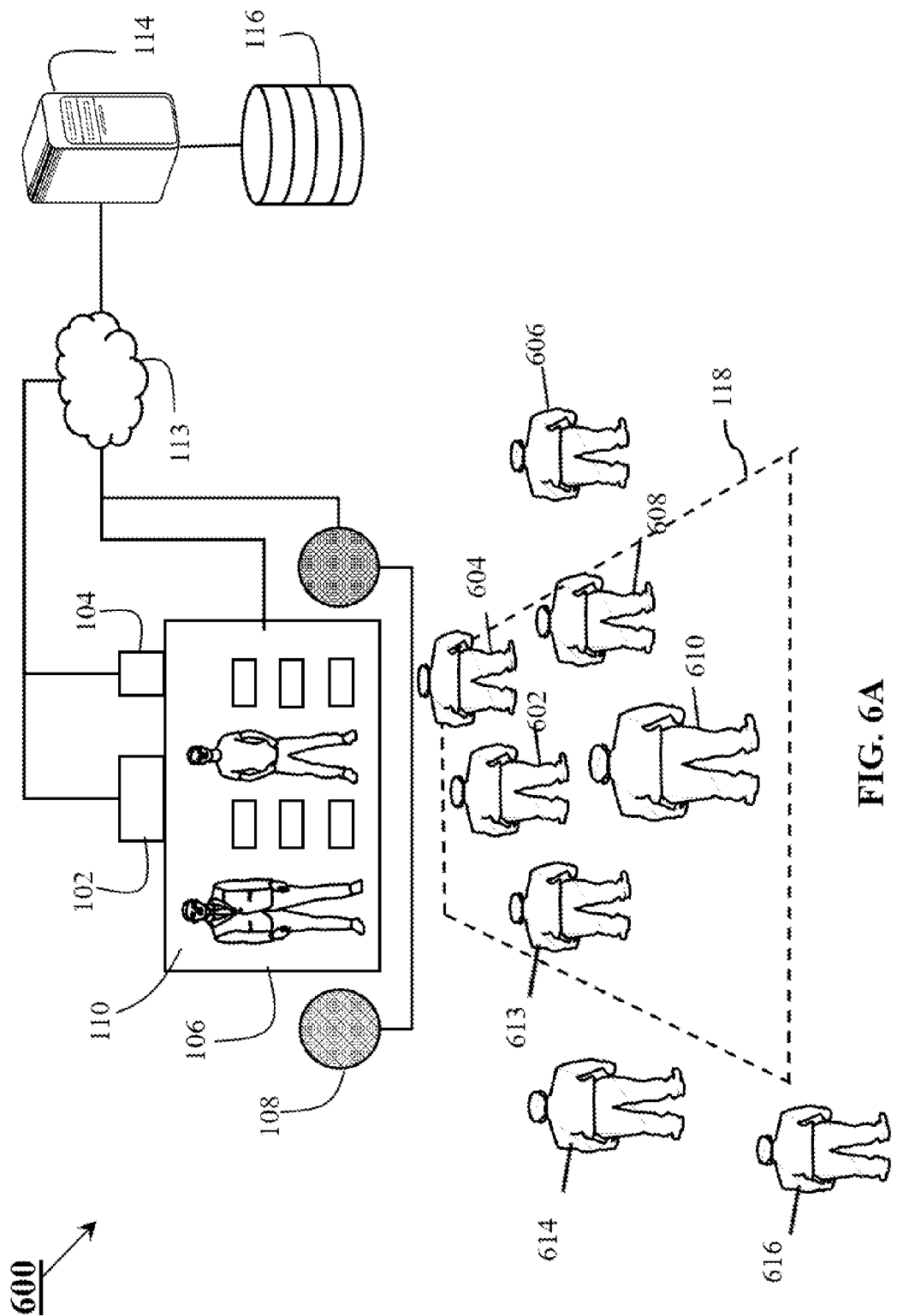
FIGS. 6A, 6B and 6C illustrate three different scenarios having a plurality of users interacting with a virtual interface on the display device, in accordance with an embodiment of the present invention.
Figure 6B:
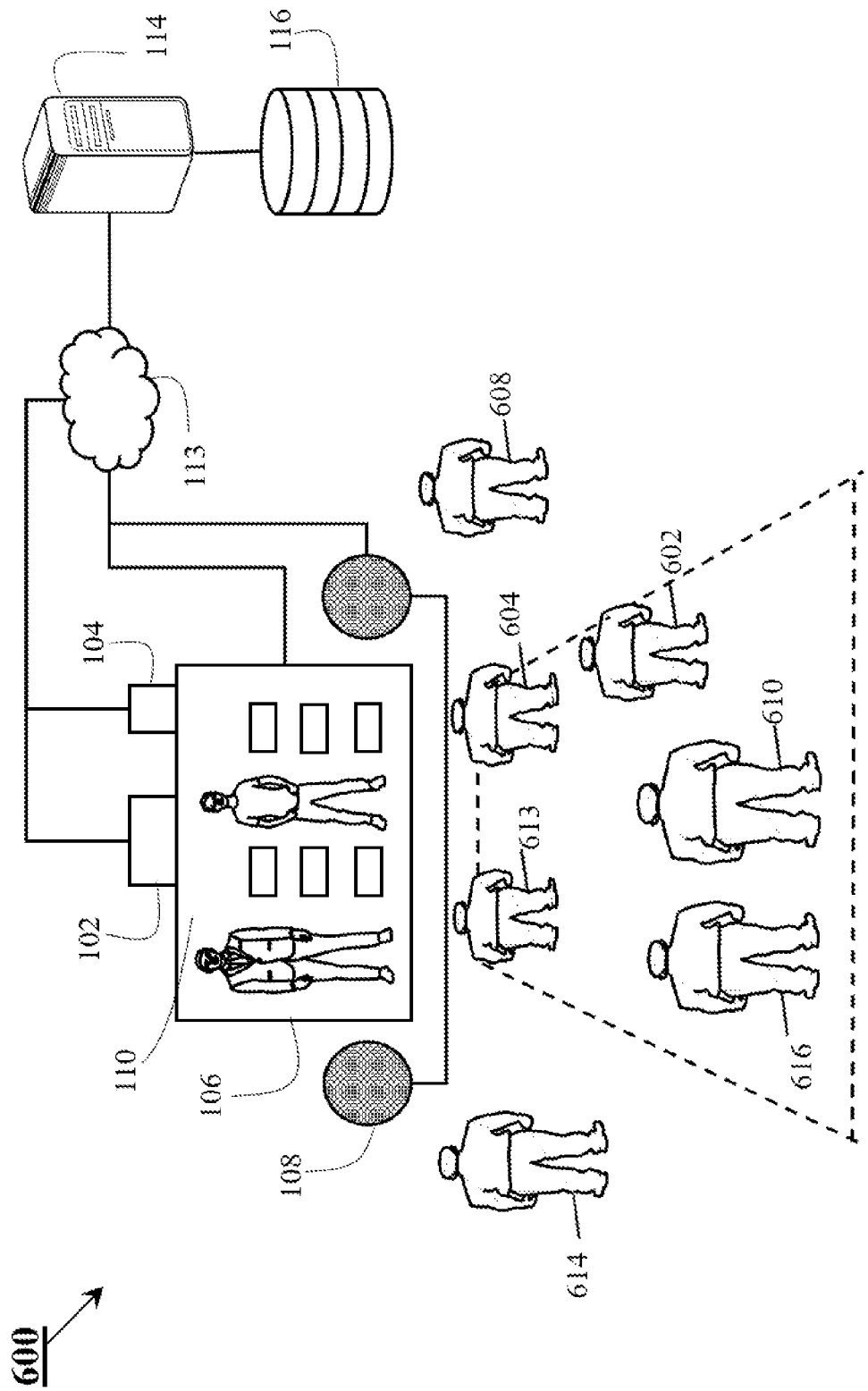
Figure 6C:
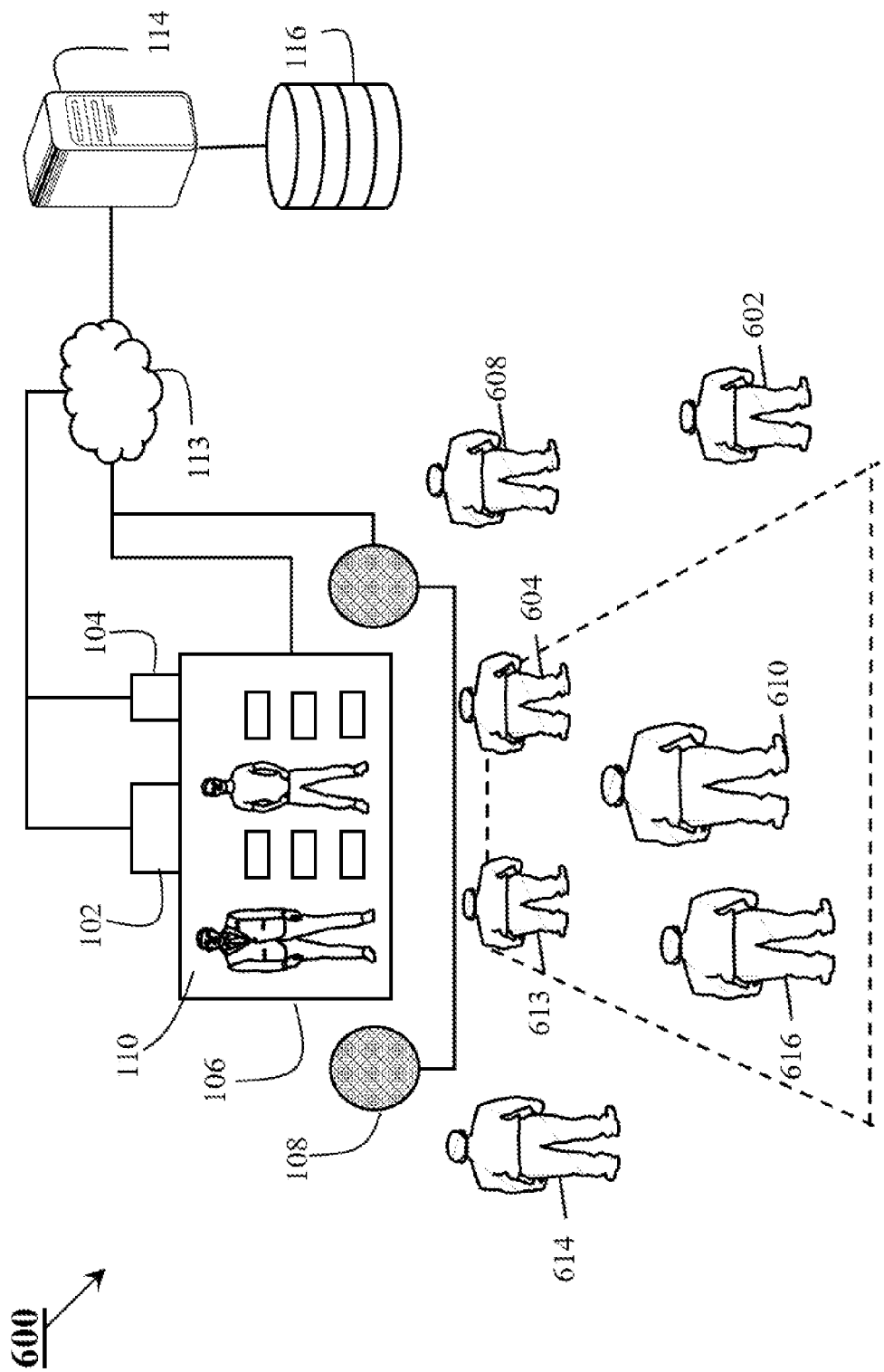

FIGS. 6A, 6B and 6C illustrate three different scenarios having a plurality of persons 602, 604, 606, 608, 610, 612, 614 and 616 in and in the vicinity of the first predetermined zone 118 and how a user is selected to interact and control the virtual interface 110 being displayed on display device 106 including the virtual intelligent object 1102, in accordance with an embodiment 600 of the present invention. The plurality of persons 602, 604, 608, 610, 612, are present in the first predetermined zone 118 and persons 606, 614 and 616 are present outside the first predetermined zone 118 but in close vicinity to the first predetermined zone 118. In accordance with an embodiment of the present invention, the depth sensing device 102 captures the 3D or 2D image of the plurality of persons 602, 604, 608, 610 and 612. The server 114 generates the virtual interface 110 including the intelligent virtual object 1102 and displays the intelligent virtual object 1102 on the display device 106. Further, the depth sensing device 102 receives the depth data and identifies the plurality of persons 602, 604, 608, 610 and 612, As shown in FIG. 6A, for instance, a person 602 is selected as the user 602 is detected by the depth sensing device 102 in terms of both horizontal and vertical distance as compared to the other users in the first predetermined zone 118. The virtual interface 110 including the intelligent virtual object 1102 shown on the display device 106 interacts with the user 602 through the gestural and/or audio input ignoring the voice and gesture actions of all other persons in or outside the first predetermined zone 118. It may be noted that the person 604 is also closer vertically to the depth sensing device 102 compared to person/user 602 but only in terms of vertical distance. Therefore, the person 604 is not identified as the user.

As shown in FIG. 6B, for instance, the user 602 has slightly moved to the right side but continues to remain in the first predetermined zone 118. In this scenario, the depth sensing device 102 will continue to interact with the user 602 based on gestural and/or audio input as the interaction between the virtual interface 110 including the intelligent virtual object 1102 shown on the display device 106 and the user 602 has not been terminated yet. It may be noted that person 610 is now more centrally located horizontally and vertically in the first predetermined zone 118 however as long as the original user 602 remains in the zone of interaction 118 the intelligent virtual object 1102 will continue to interact with the user 602.

As shown in FIG. 6C, for instance, the user 602 left the first predetermined zone 118. In this scenario, a person 610 who is located centrally both horizontally and vertically in the first predetermined zone 118 is selected as the new user. The virtual interface 110 including the intelligent virtual object 1102 shown on the display device 106 starts interacting with the new user based on the gestural and/or audio (voice) input from the new user 610.

Figure 7:
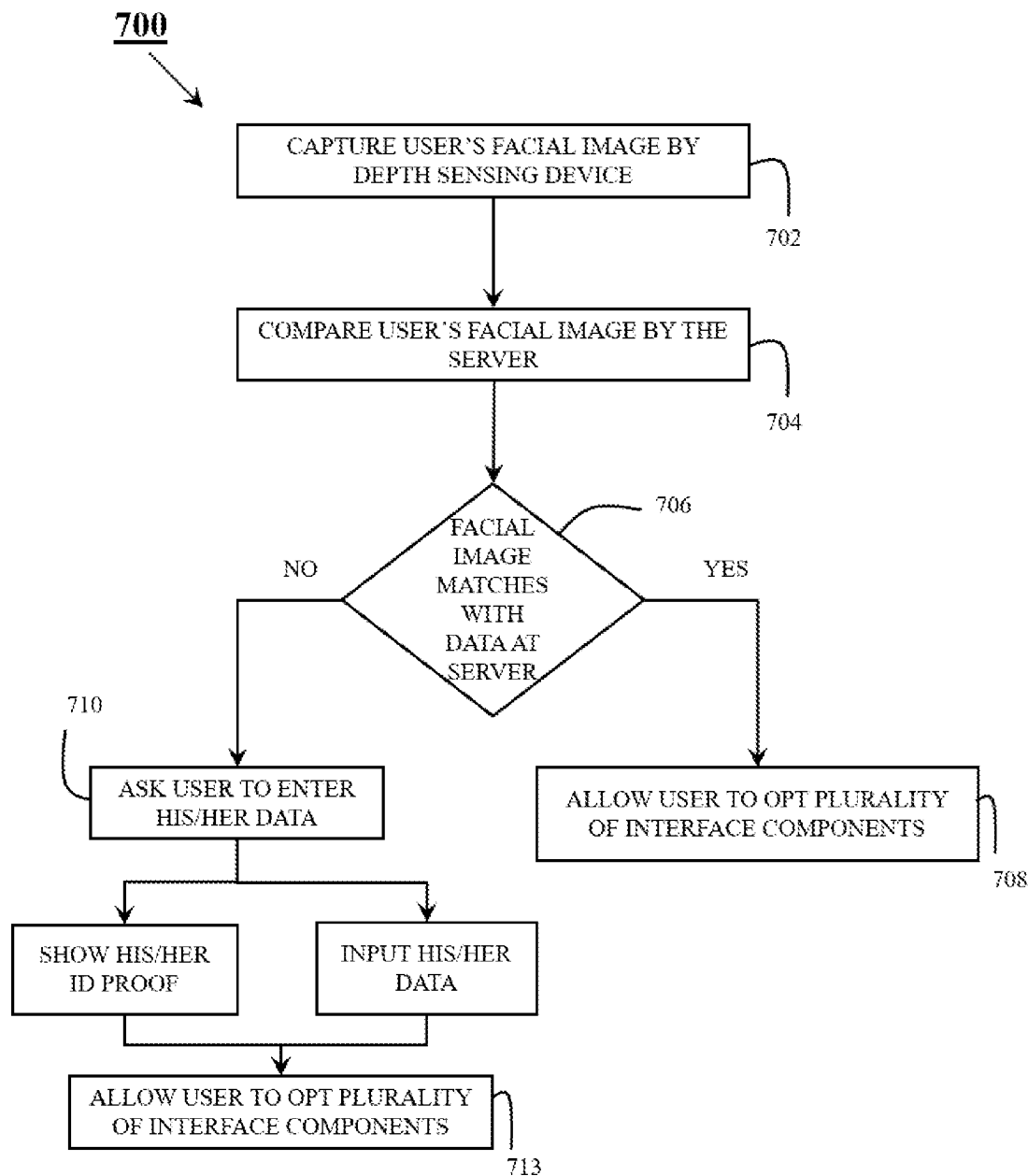
FIG. 7 illustrates a method for detecting a face of a user, in accordance with an embodiment of the present invention.

FIG. 7 illustrates a method 700 for detecting a face image of a user, in accordance with an embodiment of the present invention. The method begins at step 702, the depth sensing device 102 captures a facial image of the user and transfers the captured facial image of the user to the server 114. At step 704, the server 114 then compares the user's facial image from a pre-determined set of data. At step 706, if the facial image of the user matches with the pre-determined set of data at the server 114, the method proceeds to step 708, and the virtual interface 110 allows the user to opt from a plurality of interface components 402, 404, 406, 408, 410 and 412.

In one embodiment of the invention, an age and a gender of the user is identified from the facial image and the virtual interface 110 is generated on a basis of the age and the gender of the user. This virtual interface 110 displayed at step 708 may be customized to the particular user such customisation could be but is not limited to be based on the user's past interaction and usage of the interface, demographic details of the user such as age and gender, products the user already uses of the financial institution etc.

At step 706, if the facial image of the user does not match with the pre-determined set of data, then the method 700 proceeds to step 710, the virtual interface 110 asks the user to enter his/her real time data. This is done in further two ways. The user can either show his/her id proof or the user can input his/her real time data. The real time data comprises, but not limited to, name, age, gender, address. The real time data is stored in the storage device 116. The user may not be required to provide this data and will be taken straight to step 712. Further, at step 712, the virtual interface 110 allows the user to opt the plurality of interface components 402, 404, 406, 408, 410 and 412.

Figure 8:
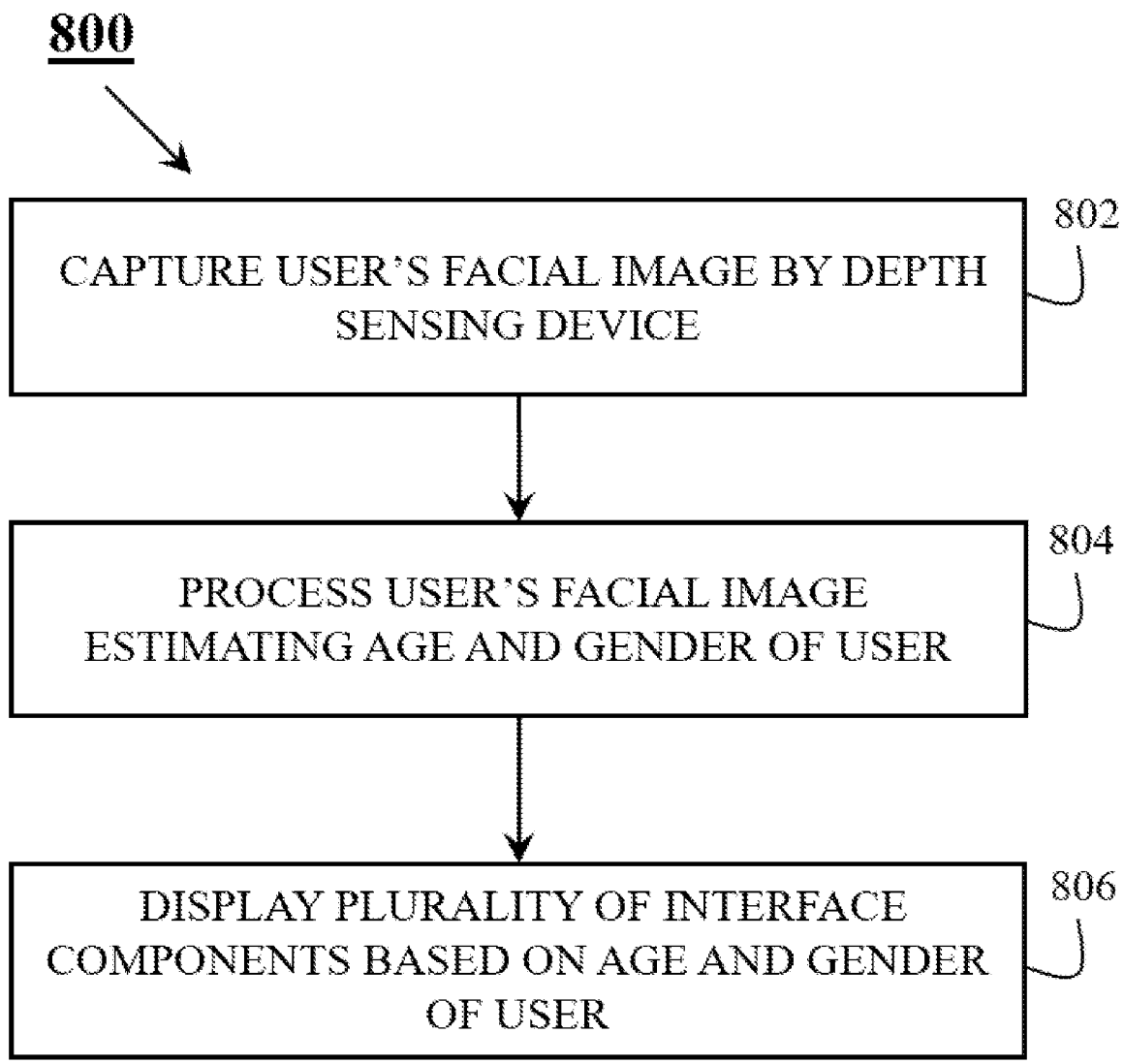
FIG. 8 illustrates a method for detecting an age and a gender, in accordance with an embodiment of the present invention.

FIG. 8 illustrates a method 800 for detecting an age and a gender, in accordance with an embodiment of the present invention. The method 800 begins at step 802, the depth sensing device 102 captures the image of the user and transfers the captured image to the server 114. At step 804, the server 114 then processes the image of the user and estimating the age and the gender of the user using different age and gender estimation techniques which may include neural networks, deep learning and machine learning algorithms. This estimation may be exact or a broad range as per the required specificity. Further, at step 806, the virtual interface 110 displays the plurality of interface components 402, 404, 406, 408, 410 and 412 on the display device 106 customized based on the age and the gender of the user. This customisation can be but is not limited to showcasing more relevant products to the customer based on his age and gender or to provide service related content via the interface to the user which would be more suitable to his age and gender. For instance, the interface may prominently highlight a retirement savings product when a user over the age of 60 years is using the interface whereas it showcases credit card products to a user who is 25 years old.

Figure 9:
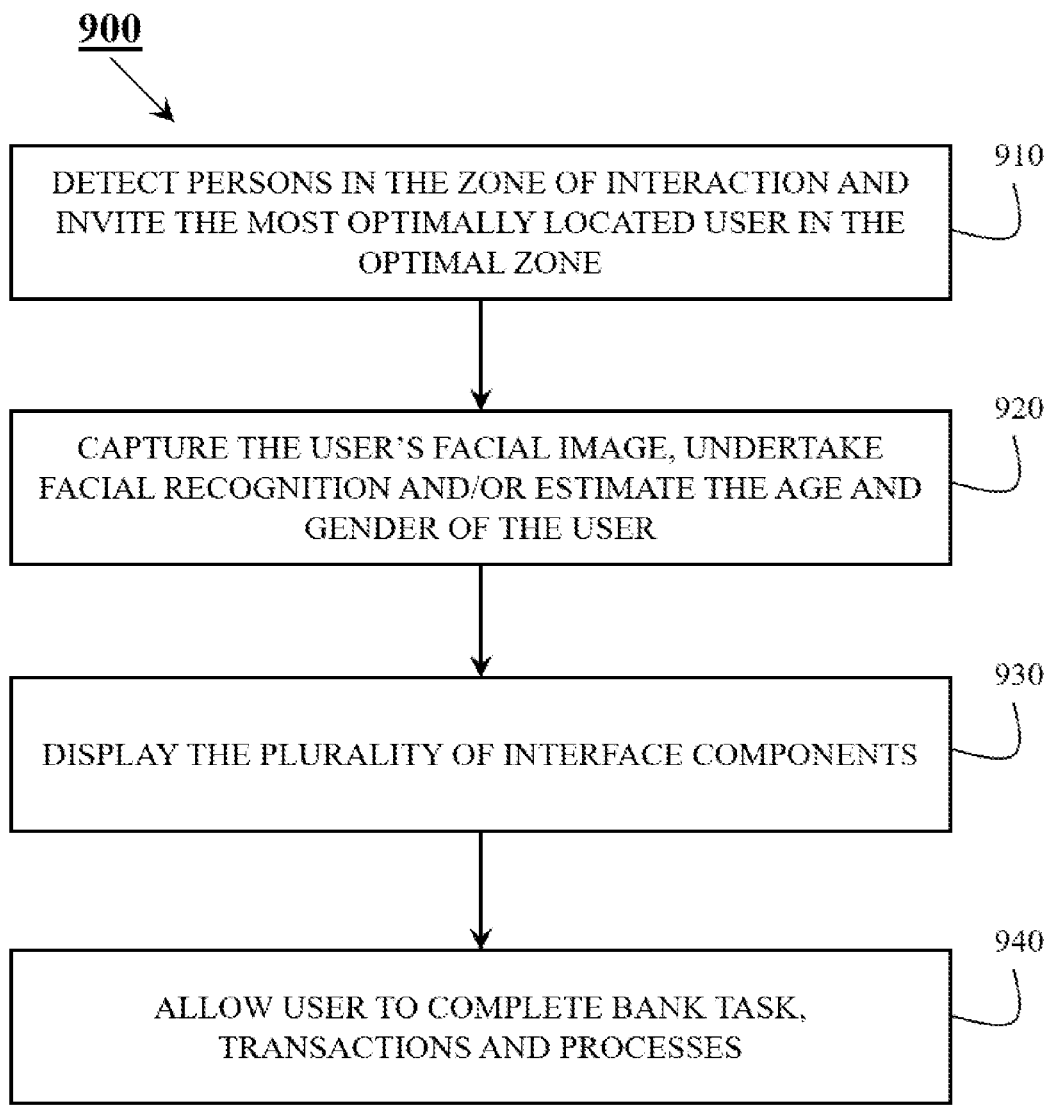
FIG. 9 illustrates a method for providing virtual banking experience, in accordance with embodiment of the present invention.

FIG. 9 illustrates a method 900 for providing virtual banking experience, in accordance with embodiment of the present invention. The method begins at step 910, the depth sensing device 102 detects a 3D or 2D image of persons in the first predetermined zone 118 and inviting the most optimally located user in the second predetermined zone 120. At step 920, the depth sensing device 102 captures the facial image of the user and transfers the captured facial image to the server 114. The server 114 then processes the facial image of the user undertakes facial recognition and/or estimates the age and the gender of the user using different age and gender estimation techniques which may include neural networks, deep learning and machine learning algorithms. This estimation may be exact or a broad range as per the required specificity. Further, at step 930, the virtual interface 110 displays the plurality of interface components 402, 404, 406, 408, 410 and 412 on the display device 106 which may be customised based on the user's identity or past usage by the user which may have been ascertained by the system using facial recognition in step 920. The virtual interface 110 may also be customized or modified or on the age and gender estimation of the user which may have been undertaken in step 920. At step 940, the user can use gestural input and/or audio input to control the options/content displayed on the display device 106. Further, at step 940, the virtual interface 110 allows the user to complete bank tasks, transactions, processes and understanding more about different banking products.

It is to be noted here that the server 114 is contemplated to have computing capabilities such as, but not limited to, a processor, a memory unit, a communication interface and a bus connecting the processor, the memory unit and the communication interface. Further, the configuration of the server 114 for undertaking the methods and processes involved in the present invention may be achieved through execution, by the processor, of the machine readable instructions fed into the memory unit. Additionally, the configuration of the server 114 may also be achieved through one or more additional modules working in tandem as will be discussed below.

Figure 10:
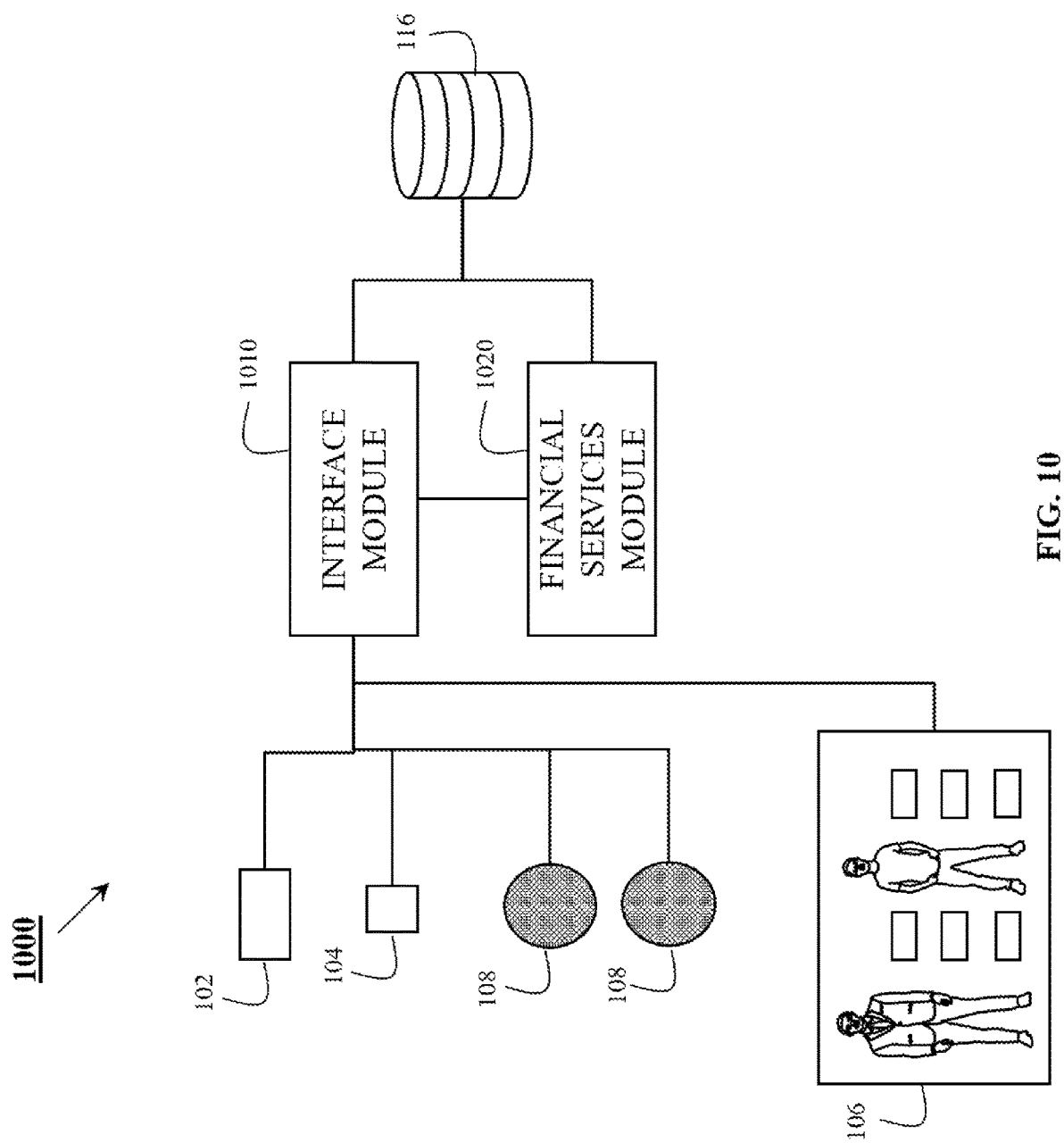
FIG. 10 illustrates a system for assisting in performing financial services, in accordance with an embodiment of the present invention.

FIG. 10 illustrates a system 1000 for assisting in performing financial services, in accordance with an embodiment of the present invention. The system 1000 includes a depth sensing device 102, a microphone 104, a display device 106), one or more speakers 108, an interface module 1010 and a financial service module 1020. The depth sensing device 102 is configured to capture an image of a user and a gestural input from the user. The microphone 104 is configured to receive an audio input. The interface module 1010 is configured to receive an image of a user from a depth sensing device 102, generate a virtual interface 110 as a response to receiving the image of the user, the virtual interface 110 comprising an intelligent virtual object 1102, wherein the virtual interface 110 is generated as a response to the user entering a first predetermined zone 118, perform one or more of transmitting the virtual interface 110 to the display device 106 for display of the virtual interface 110 at the display device 106, and transmitting the audio output to the one or more speakers 108 for provision of the audio output through the one or more speakers 108, and receive one or more of a gestural input from the depth sensing device 102, and an audio input from a microphone 104. The financial service module 1020 is configured to perform a financial service in response to receiving one or more of the gestural input, and the audio input.

In one embodiment of the invention, the intelligent virtual object 1102 is configured to invite the user into one or more of the plurality of subzones 202, 203 using one or more of gestural actions of the intelligent virtual object 1102 and the audio output. In one embodiment of the invention, the intelligent virtual object 1102 is configured to invite the user into one or more of the plurality of subzones 202, 203 using one or more of gestural actions of the intelligent virtual object 1102 and the audio output on basis of the one or more of the gestural input and the audio input.

In one embodiment of the invention, the interface module 1010 is further configured to determine a pitch angle of a face of the user, with respect to the depth sensing device 102, wherein the one or more of the gestural input from the depth sensing device 102, and the audio input from the microphone 104 is received on a basis of the pitch angle being within a predetermined range. In one embodiment of the invention, the interface module 1010 is further configured to modify the virtual interface 110 in response to receiving the one or more of the gestural input, and the audio input, upon verifying that the pitch angle is within the predetermined range and that no audio output is being provided through the one or more speakers 108. In one embodiment of the invention, the interface module 1010 is further configured to receive an image of an identification document and a plurality of identification details for verification of the user. In one embodiment of the invention, the interface module 1010 is further configured to extract a facial image of a face of the user.

In one embodiment of the invention, the interface module 1010 is further configured to compare the facial image with a plurality of historical facial images stored in a storage device 116, for verification of the user, wherein the virtual interface 110 is generated on a basis of historical data associated with the facial image of the user. In one embodiment of the invention, the interface module 1010 is further configured to identify an age and a gender of the user from the facial image and generate the virtual interface 110, including the intelligent virtual object 1102, on the basis of the age and the gender of the user. In one embodiment of the invention, for receiving the gestural input, the interface module 1010 is further configured to receive a selection of an interface component of the plurality of interface components 402, 404, 406, 408, 410 and 412. In one embodiment of the invention, the interface module 1010 is further configured to provide a plurality of auxiliary indications to the user in response to receiving the one or more of the gestural input, and the audio input. In one embodiment of the invention, the plurality of auxiliary indications is provided in order to direct the user to a particular area, the plurality of auxiliary indications being provided through connection with one or more of projectors, directional lighting fixtures and speakers, directing the user to the particular area, by means of one or more of projections, lights and sounds, respectively, and being controlled through one or more of wired and wireless means.

In one embodiment of the invention, the interface module 1010 is further configured to switch the virtual interface 110 to an idle state during absence of the user from the first predetermined zone 118, wherein, in the idle state the intelligent virtual object 1102 is configured to perform predetermined activities in order to invite the user into the first predetermined zone 118.

In some examples, the systems described herein, may include one or more processors, one or more forms of memory, one or more input devices/interfaces, one or more output devices/interfaces, and machine-readable instructions that when executed by the one or more processors cause the system to carry out the various operations, tasks, capabilities, etc., described above.

In some embodiments, the disclosed techniques can be implemented, at least in part, by computer program instructions encoded on a non-transitory computer-readable storage media in a machine-readable format, or on other non-transitory media or articles of manufacture. Such computing systems (and non-transitory computer-readable program instructions) can be configured according to at least some embodiments presented herein, including the processes described in above description.

The programming instructions can be, for example, computer executable and/or logic implemented instructions. In some examples, a computing device is configured to provide various operations, functions, or actions in response to the programming instructions conveyed to the computing device by one or more of the computer readable medium, the computer recordable medium, and/or the communications medium. The non-transitory computer readable medium can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof.

Further, the operations need not be performed in the disclosed order, although in some examples, an order may be preferred. Also, not all functions need to be performed to achieve the desired advantages of the disclosed system and method, and therefore not all functions are required.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claims.

We claim:

1. A method (150) for assisting in performing financial services, the method (150) comprising steps of:
    receiving (151) a three dimensional image of one or more persons and further selecting a user from a depth sensing device (102);
    generating (153) a virtual interface (110) as a response to receiving the image of the user, the virtual interface (110) comprising an intelligent virtual object (1102), wherein the virtual interface (110) is generated as a response to the user entering a first predetermined zone (118) in a physical environment of the user, wherein the first predetermined zone (118) comprises a plurality of subzones (202, 203),
    wherein, one of the plurality of subzones (202, 203) comprises a second predetermined zone (120), and wherein, the plurality of subzones (202, 203) exist in the physical environment of the user, wherein the intelligent virtual object (1102) invites the user into the second predetermined zone using one or more gestural actions of the intelligent virtual object (1102) including an audio output, wherein the plurality of subzones are a part of a field of view of the depth sensing device (102);
    wherein the one of more gestural action further include movement of a limb or face;
    performing (155) one or more of transmitting the virtual interface (110) to a display device (106) for display of the virtual interface (110) at the display device (106), and transmitting the audio output to one or more speakers (108) for provision of the audio output through the one or more speakers (108);
    receiving (157) one or more of a gestural input comprising gestures made by the user from the depth sensing device (102), and an audio input from a microphone (104); and
    performing (159) a financial service in response to receiving one or more of the gestural input comprising the gestures made by the user, and the audio input.

2. The method (150) as claimed in claim 1, further comprising a step of determining a pitch angle of a face of the user, with respect to the depth sensing device (102), wherein the one or more of the gestural input received by the depth sensing device (102), and the audio input received by the microphone (104) are received on a basis of the pitch angle being within a predetermined range, said method further comprising a step of modifying the virtual interface (110) in response to receiving the one or more of the gestural input, and the audio input, upon verifying that the pitch angle is within the predetermined range and that no audio output is being provided through the one or more speakers (108).

3. The method (150) as claimed in claim 1, further comprising a step of capturing and receiving an image of identification document and a plurality of identification details for verification of the user, held and displayed by the user at the same place where the user is standing without requiring any movement of the user, by the depth sensing device (102).

4. The method (150) as claimed in claim 1, further comprising a step of extracting a facial image of a face and 3-dimensional (3D) depth data of the user, further comprising a step of estimating an age and a gender of the user from the facial image and the 3D depth data of the user and generating the virtual interface (110), including the intelligent virtual object (1102), on a basis of the age and the gender of the user.

5. The method (150) as claimed in claim 1, wherein the virtual interface (110) further comprises a live image feed (416) of the user entering the first predetermined zone (118) in the present physical environment of the user, the live image feed (416) being differentiated from a virtual background distinct from a background of the user in the virtual interface (110) and displayed on the display device (106).

6. The method (150) as claimed in claim 1, wherein the virtual interface (110) further comprises a plurality of interface components (402, 404, 406, 408, 410 and 412) customized based on a demographic marker or identity of the user, wherein the step of receiving the gestural input or the audio input further comprises receiving a selection of an interface component from the plurality of interface components (402, 404, 406, 408, 410 and 412).

7. The method (150) as claimed in claim 1, further comprising a step of providing a plurality of auxiliary indications to the user, the auxiliary indications being in the user's present physical environment, in addition to and separate from the indicators on the display device (106) and the speakers (108), in response to receiving the one or more of the gestural input, and the audio input, wherein the plurality of auxiliary indications is provided in order to direct the user to a particular area in the user's present physical environment, at a distance from the user's current location, the plurality of auxiliary indications being provided through one or more of projected directional lighting, lighting fixtures, lighted floor arrows and directional speakers, controlled through one or more of wired or wireless means, directing the user to the particular area, and the auxiliary indications in the user's present physical environment being in addition to and separate from the indicators on the display device (106) and the speakers (108).

8. The method (150) as claimed in claim 1, further comprising a step of switching the virtual interface (110) to a true idle state during the absence of the one or more persons from the first predetermined zone (118) as detected by the depth sensing device (102), one or more of the plurality of subzones (202, 203), wherein, in the true idle state the intelligent virtual object (1102) performs predetermined activities of a human-like waiting nature, wherein the intelligent virtual object (1102) is a computer generated artificially intelligent object in at least one of a human form, an animal form or a cartoon character form.

9. The method (150) as claimed in claim 1, further comprising a step of switching the virtual interface (110) to an inviting state, during the presence of the person or the plurality of persons in the first predetermined zone (118) to invite the selected user into the second predetermined zone (120).

10. A system (1000) for assisting in performing financial services, the system (1000) comprising:
a depth sensing device (102);
a microphone (104);
a display device (106);
one or more speakers (108);
a processor comprising an interface module (1010), and a financial service module (1020);
wherein the depth sensing device (102) is configured to capture a three dimensional image of one or more persons and further selecting a user and a gestural input from the user;
wherein the microphone (104) is configured to receive an audio input; wherein the interface module (1010) is configured to:
receive an image of a user from the depth sensing device (102);
generate a virtual interface (110) as a response to receiving the image of the user, the virtual interface (110) comprising an intelligent virtual object (1102), wherein the virtual interface (110) is generated as a response to the user entering a first predetermined zone (118) in a physical environment of the user, wherein the first predetermined zone (118) comprises a plurality of subzones (202, 203),
wherein, one of the plurality of subzones (202, 203) comprises a second predetermined zone (120), and wherein, the plurality of subzones (202, 203) exist in the physical environment of the user, wherein the intelligent virtual object (1102) invites the user into the second predetermined zone using the one or more of gestural actions the intelligent virtual object (1102) including an audio output, wherein the plurality of subzones are a part of a field of view of the depth sensing device (102);
wherein the one of more gestural action further include movement of a limb or face;
perform one or more of transmitting the virtual interface (110) to the display device (106) for display of the virtual interface (110) on the display device (106), and transmitting the audio output to the one or more speakers (108) for provision of the audio output through the one or more speakers (108); and
receive one or more of a gestural input comprising gestures made by the user from the depth sensing device (102), and an audio input from the microphone (104);
wherein the financial service module (1020) is configured to perform a financial service in response to receiving one or more of the gestural input comprising the gestures made by the body of the user, and the audio input.

11. The system (1000) as claimed in claim 10, wherein the interface module (1010) is further configured to determine a pitch angle of a face of the user, with respect to the depth sensing device (102), wherein the one or more of the gestural input received by the depth sensing device (102), and the audio input received by the microphone (104) are received on a basis of the pitch angle being within a predetermined range, wherein the interface module (1010) is further configured to modify the virtual interface (110) in response to receiving the one or more of the gestural input, and the audio input, upon verifying that the pitch angle is within the predetermined range and that no audio output is being provided through the one or more speakers (108).

12. The system (1000) as claimed in claim 10, wherein the interface module (1010) is further configured with respect to the depth sensing device (102) capturing and receiving an image of an identification document and a plurality of identification details for verification of the user, held and displayed by the user towards the depth sensing device (102) at the same place where the user is standing without requiring any movement of the user.

13. The system (1000) as claimed in claim 10, wherein the interface module (1010) is further configured to extract a facial image of a face and 3-dimensional (3D) depth data of the user, wherein the interface module (1010) is configured to estimate an age and a gender of the user from the facial image and the 3D depth data of the user and generating the virtual interface (110), including the intelligent virtual object (1102), on a basis of the age and the gender of the user.

14. The system (1000) as claimed in claim 10, wherein the virtual interface (110) further comprises a live image feed (416) of the user entering the first predetermined zone (118) in the present physical environment of the user, the live image feed (416) being differentiated from a virtual background distinct from the actual background of the user in the virtual interface (110) and displayed on the display device (106).

15. The system (1000) as claimed in claim 10, wherein the virtual interface (110) further comprises a plurality of interface components (402, 404, 406, 408, 410 and 412) customized based on a demographic marker or identity of the user wherein for receiving the gestural or the audio input, the interface module (1010) is further configured to receive a selection of an interface component from the plurality of interface components (402, 404, 406, 408, 410 and 412).

16. The system (1000) as claimed in claim 10, wherein the interface module (1010) is further configured to provide a plurality of auxiliary indications to the user, the auxiliary indications being in the user's present physical environment, in addition to and separate from the indicators on the display device (106) and the speakers (108), in response to receiving the one or more of the gestural input, and the audio input, wherein the plurality of auxiliary indications is provided in order to direct the user to a particular area, in the user's present physical environment, at a distance from the user's current location the plurality of auxiliary indications being provided through one or more of projected directional lighting, lighting fixtures, lighted floor arrows and directional speakers, controlled through one or more of wired or wireless means directing the user to the particular area, and the auxiliary indications in the user's present physical environment being in addition to and separate from the indicators on the display device (106) and the speakers (108).

17. The system (1000) as claimed in claim 10, wherein the interface module (1010) is further configured to switch the virtual interface (110) to a true idle state during the absence of person from the zone of interaction (118), first predetermined zone (118), one or more of the plurality of subzones (202, 203) as detected by the depth sensing device (102), wherein, in the true idle state the intelligent virtual object (1102) performs predetermined activities of a human-like waiting nature, wherein the intelligent virtual object (1102) is a computer generated artificially intelligent object in at least one of a human form, an animal form or a cartoon character form.

18. The system (1000) as claimed in claim 10, wherein the interface module (1010) is further configured to switch the virtual interface (110) to an inviting state during the presence of the person or the plurality of persons in the first predetermined zone (118), to invite the selected user into the second predetermined zone (120).

\* \* \* \* \*